(12) United States Patent
Oppliger et al.

(10) Patent No.: US 8,627,943 B2
(45) Date of Patent: Jan. 14, 2014

(54) GUIDE ARRANGEMENT FOR USE WITH A TRANSPORT MEMBER

(75) Inventors: Jean-Claude Oppliger, Niederhasli (CH); Michael Landolt, Oftringen (CH)

(73) Assignee: Mueller Martini Holding AG, Hergiswil (CH)

( * ) Notice: Subject to any disclaimer, the term of this patent is extended or adjusted under 35 U.S.C. 154(b) by 0 days.

(21) Appl. No.: 13/473,055

(22) Filed: May 16, 2012

(65) Prior Publication Data

US 2013/0001051 A1  Jan. 3, 2013

Related U.S. Application Data

(63) Continuation of application No. PCT/CH2010/000281, filed on Nov. 9, 2010.

(30) Foreign Application Priority Data

Nov. 18, 2009  (CH) .................................. 01781/09

(51) Int. Cl.
| | |
|---|---|
| *B65G 17/32* | (2006.01) |
| *B65G 17/20* | (2006.01) |
| *B65G 21/18* | (2006.01) |
| *B65G 23/14* | (2006.01) |
| *B65H 29/00* | (2006.01) |

(52) U.S. Cl.
CPC ................ *B65G 17/20* (2013.01); *B65G 17/32* (2013.01); *B65G 21/18* (2013.01); *B65G 23/14* (2013.01); *B65H 29/00* (2013.01)
USPC ......... 198/470.1; 198/644; 198/838; 198/839

(58) Field of Classification Search
USPC ................ 198/860.2, 838, 470.1–472.1, 644, 198/735.2; 104/111, 172.4
See application file for complete search history.

(56) References Cited

U.S. PATENT DOCUMENTS

| | | | | |
|---|---|---|---|---|
| 3,822,011 | A * | 7/1974 | Braun et al. ................ | 198/735.2 |
| 5,302,156 | A * | 4/1994 | Infanger ....................... | 474/148 |
| 5,400,717 | A | 3/1995 | Hoehn | |
| 5,598,784 | A * | 2/1997 | Kubsik et al. ................. | 104/111 |
| 5,960,938 | A * | 10/1999 | Clopton ................... | 198/867.13 |
| 6,269,944 | B1 * | 8/2001 | Taylor ......................... | 198/860.2 |
| 6,283,038 | B1 * | 9/2001 | Mattila ........................... | 104/89 |
| 7,404,549 | B2 * | 7/2008 | Meier et al. ................. | 270/52.14 |

FOREIGN PATENT DOCUMENTS

| | | |
|---|---|---|
| DE | 2347459 | 4/1975 |
| DE | 29722233 | 3/1998 |
| DE | 202008007100 | 11/2009 |
| EP | 0 540 866 A2 | 9/1992 |

(Continued)

OTHER PUBLICATIONS

International Search Report of PCT/CH2010/000281 Filed May 30, 2011 With an English Translation.

*Primary Examiner* — Mark A Deuble
(74) *Attorney, Agent, or Firm* — Venable LLP; Robert Kinberg

(57) ABSTRACT

A guide arrangement is provided for guiding movement of a transport member to convey products in a conveying direction of a conveying section having a predetermined course. The transport member includes a number of functional units operatively connected to each other. The guide arrangement includes a number of sequentially connected guide rail elements defining a guide channel along the conveying section. The guide channel has inside walls including structure to guide the transport member.

20 Claims, 14 Drawing Sheets

(56) References Cited

FOREIGN PATENT DOCUMENTS

| EP | 0713834 | A2 | 5/1996 |
|---|---|---|---|
| EP | 1029815 | A1 | 1/2000 |
| WO | WO-99/33722 | | 7/1999 |
| WO | WO-99/33730 | | 7/1999 |
| WO | WO-99/33731 | | 7/1999 |
| WO | WO-99/33732 | | 7/1999 |

* cited by examiner

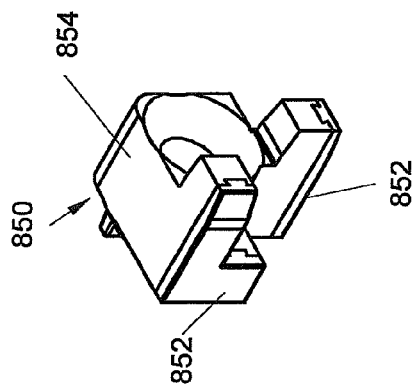
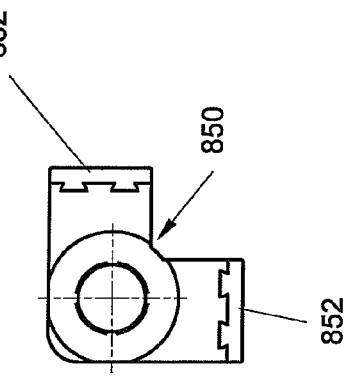
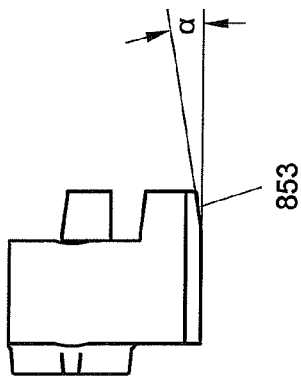
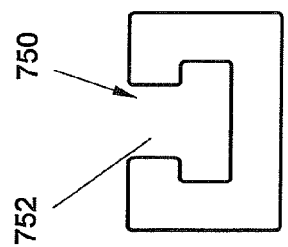

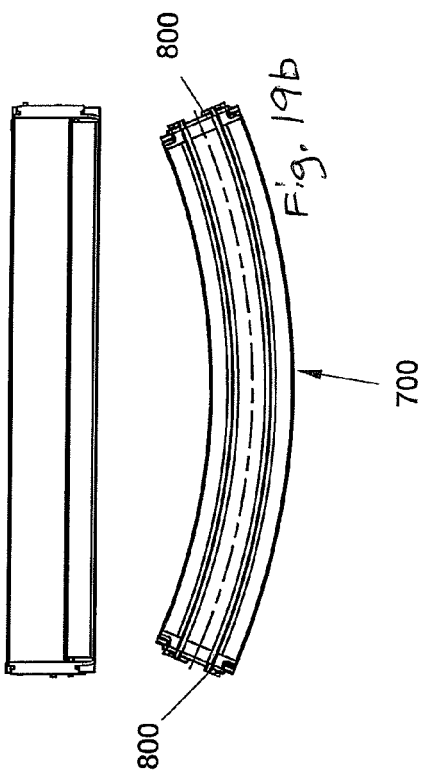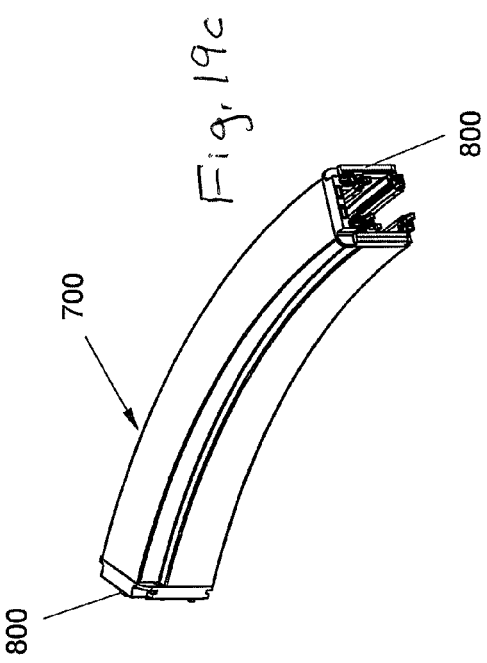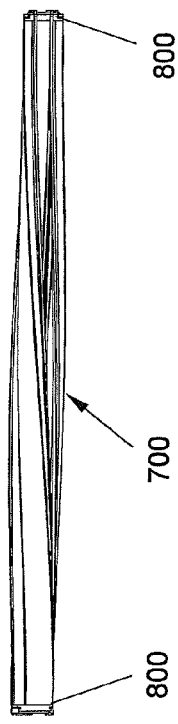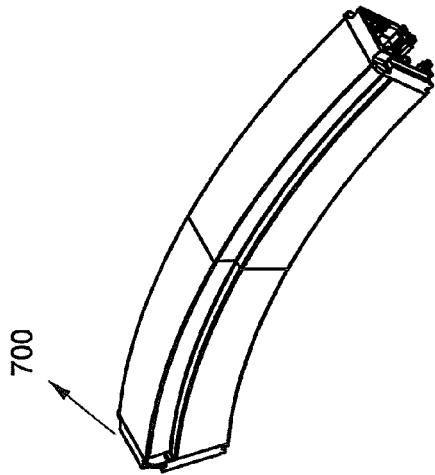

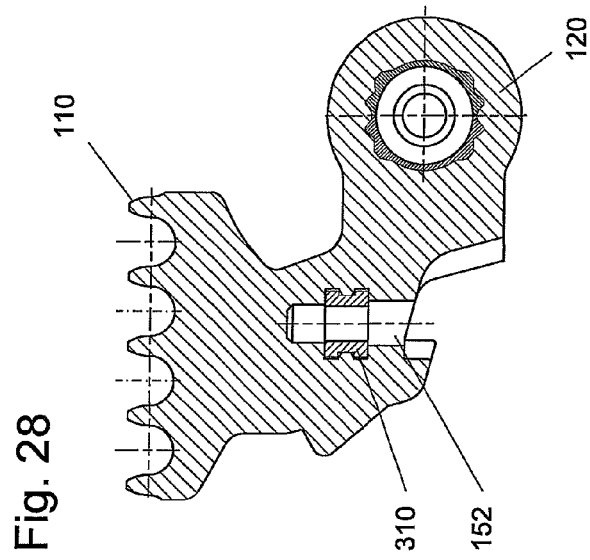
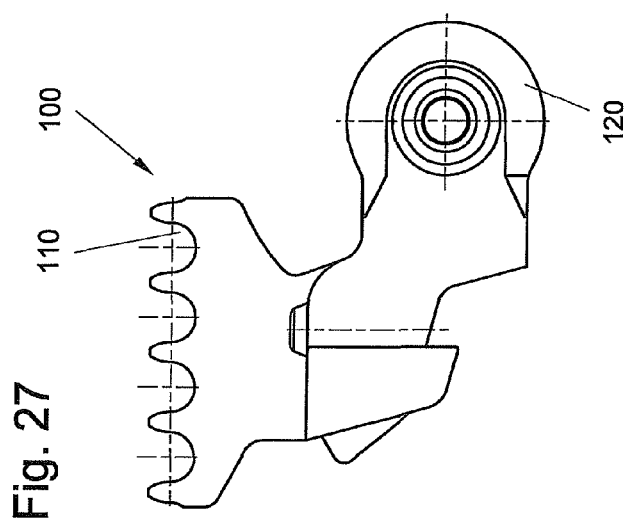
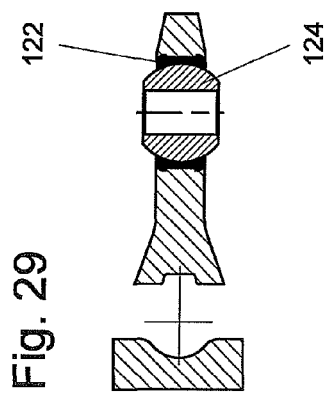

GUIDE ARRANGEMENT FOR USE WITH A TRANSPORT MEMBER

CROSS-REFERENCE TO RELATED APPLICATIONS

This application is a continuation of International Application No. PCT/CH2010/000281, filed Nov. 9, 2010, claiming priority to Swiss Patent Application No. 01781/09, filed on Nov. 18, 2009, the entire contents of both applications being incorporated herein by reference in their entireties.

BACKGROUND

1. Technical Field

The invention relates to a guide arrangement to guide a movement of a transport member to convey products in a conveying direction on a conveying section, for example an endlessly circulating section, having a shape that is predetermined by the guide arrangement. The invention furthermore relates to interdependent uses of the guide arrangement and the transport member for conveying printed products and other transportable products.

2. Prior Art

A conveying device operating with the aid of a conveying chain, which circulates continuously and is guided with the aid of a suitable guide arrangement along a conveying section, for example preferably an endless conveying section, are used for transporting printed products between individual processing stations such as inserters, addressing machines, glue applicators and the like. In the process, the printed products are normally held by grippers and/or clamps mounted on the chain links and, if applicable, are released by these grippers at the processing stations. To ensure a continuous operation, the conveying chain is normally driven continuously circulating along the conveying section which is predetermined by the guide arrangement. The conveying section generally comprises straight and curved segments, wherein the curved segments can be arranged within a horizontal plane, a vertical plane or a plane extending at an angle upward or downward. The guide arrangement must therefore also have corresponding straight-line as well as curved guide elements which determine the curved areas of the conveying section.

The conveying section can extend over a length of 100 m or more and, in the process, can extend through the complete production space in the horizontal and vertical directions. For that reason, the guide arrangement which functions to preset the conveying section cannot be produced as a single piece, but must be composed of individual guide elements which are joined with the aid of suitable connecting arrangements.

These types of guide arrangements are described, for example, in International Patent Publication Nos. WO99/33731, WO99/33722, WO99/33732 and WO99/33730 and European Patent document EP 1 029 815 A1. During the assembly of the known guide arrangements, the individual guide elements are normally joined along the end faces and are then fixedly connected to each other with the aid of clamping devices that engage in the side walls of the guide elements which, in turn, are connected to each other via connecting elements taking the form of bolts or the like.

During the assembly of the guide arrangements, attention must be paid to ensure that the guiding surfaces of the guide elements which serve to guide the movement of the conveying chain directly transition to each other smoothly adjoining, so as to ensure a low noise and low wear operation of the conveying device comprising the guide arrangement and the conveying chain. In many cases, this requirement relating to the transitions between the guide elements requires a secondary treatment of the transition areas, such as a grinding treatment. However, even after such an additional treatment, a non-quiet movement of the conveying chain along the guide arrangement is still observed in some cases.

SUMMARY OF THE INVENTION

In view of these problems outlined for the prior art, it is an object of the present invention to remedy the disadvantages discussed above in the prior art and to specify a guide arrangement for guiding the movement of a conveying chain designed to convey printed products, which guide arrangement is easy to assemble while ensuring a low noise and low wear operation. It is a further object to provide a conveying device which comprises a guide arrangement of this type.

It is furthermore an object to provide a guide arrangement which can be operated without problem while equipped with transport members as disclosed in the prior art. The object therefore not only is to design an inventive guide arrangement for a specifically designed transport member. The object furthermore is to ensure a low noise and low wear operation.

The above and other objects are achieved according to the invention, wherein according to one embodiment there is provided a guide arrangement for guiding movement of a transport member to convey products in a conveying direction of a conveying section having a predetermined course, wherein the transport member includes a number of functional units operatively connected to each other, the guide arrangement comprising: a number of sequentially connected guide rail elements defining a guide channel along the conveying section, the guide channel having inside walls including structure to guide the transport member.

In another embodiment of the guide arrangement according to the invention, connecting elements are provided on end faces of the individual guide elements, which extend crosswise, approximately perpendicular to the conveying section, wherein these connecting elements can subsequently be connected in the correct position with the aid of a positive or form-fitting engagement. The connecting elements can be attached to the guide elements at a factory, so that the structural components consisting of the guide element and the connecting element can be pre-assembled, using standard structural elements such as straight-line guide elements, curved guide elements and connecting elements. Pre-assembly at a plant can thus ensure a smooth transition from the guide element to the connecting element. At the location of installation, the structural components which are pre-assembled in this way can be joined along the contact surfaces in the region where the contact surfaces of the connecting elements are arranged opposite each other, meaning where they extend approximately perpendicular to the conveying section. As a result of the form-locking connection of the contact surfaces which face away from the corresponding guide elements, an automatic centering of the pre-assembled components, relative to each other, takes place. This automatic centering ensures a smooth transition between the guiding surfaces of the individual components that function to guide the conveying chain. The additional expenditure resulting from providing the guide elements and the connecting elements can be accepted without problem in view of the achieved simplification of the assembly at the installation location which results in a noticeable shortening of the assembly time that is not offset, not even by the pre-production of the components at the plant.

In one embodiment, the interlocking or form-locking engagement of the contact faces, arranged opposite each other, for the connecting elements attached to the guide elements can be achieved if one contact surface is provided with at least one projection and the other contact surface has at least one complementary designed depression and/or recess for accommodating the projection in an interlocking manner. The connecting elements are normally provided for this with an essentially planar delimiting surface that faces the guide element, as well as a contact surface that extends approximately parallel to this planar delimiting surface. A projection on the contact surface extends along the conveying section, approximately in the direction opposite the direction for the delimiting surface which is facing the guide element, while the depression extends in the direction toward the delimiting surface facing the guide element.

The number of components required for the production of optional guide arrangements may be reduced by providing each contact surface with at least one projection and at least one depression or recess, such that an interlocking connection can be achieved in the region of two uniform contact surfaces that face each other. The depression and the projection in the contact surface are embodied mirror-symmetrical, relative to a straight line extending perpendicular to the conveying section.

A self-centering and interlocking connection between the connecting elements and/or the pre-assembled structural components may be produced by using connecting elements that have a projection in a sectional plane, extending perpendicular to the conveying direction, with a tapered cross-sectional surface in the direction toward the adjacent contact surface and/or depression, wherein the depression intended for accommodating the projection can also have a correspondingly tapered cross-sectional surface.

The interlocking engagement of the connecting elements is normally not only intended to prevent a translational offset of the components produced therewith, relative to each other, in a direction transverse to the conveying direction, but also to prevent a tilting movement of these components relative to a tilt axis that extends parallel to the conveying direction. It is useful in this connection if at least one projection and the thereto complementary depression in a sectional plane that extends perpendicular to the conveying direction has a cross-sectional surface that counteracts a rotational movement around an axis of rotation extending parallel to the conveying direction, meaning if this cross-sectional surface deviates from the circular disk or ring shape.

In an embodiment, at least one contact surface may be provided with two, three, or more projections which, in the fully assembled state, are accommodated form-locking inside complementary embodied depressions or recesses in the opposite contact surface.

Even though it is also conceivable that guide arrangements with sufficient stability can be created with the aid of the interlocking connection between the contact surfaces of the connecting elements, it has proven useful in view of the operating reliability of guide arrangements according to the invention if the connecting arrangement comprises a fastening arrangement for connecting the elements in the region of the contact surfaces which is accessible, for example, from the outside and functions to secure the interlocking connection between the connecting elements.

A fastening arrangement of this type can be embodied in the form of a fastening bolt, especially a screw bolt, extending parallel to the conveying section and through a connecting element and engaging in a thread, such as a threaded nut which is accessible from the outside and may be located in the adjacent connecting element. In view of avoiding any projecting parts in the region of the guide arrangement, the fastening bolt may fit into a grooved recess, formed in an outer delimiting surface of the guide element and extending along the conveying section, so as to make the bolt head accessible, for example, when using an Allen wrench. To secure the threaded nut against turning, it can be accommodated inside a corresponding recess in one of the connecting elements.

With the above-described fastening arrangement, the bolt inside the grooved recess must be screwed into the threaded nut in the direction of the conveying section, wherein this can cause problems during the installation. The fastening arrangement used for securing the interlocking connection may include two fastening bolts that can be inserted into adjacent connecting elements which fit against each other with their contact surfaces when fully assembled, can be secured therein, and respectively extend transverse, especially perpendicular, to the conveying section. The two fastening bolts may be positioned parallel to each other, with the coupling head located outside the connecting elements. These bolts may be connected via a locking element which can be locked in place with the aid of the two coupling elements. With this type of fastening arrangement, the fastening bolts are inserted into corresponding recesses in the connecting elements, wherein the fastening bolts are locked in place in the corresponding recesses located in the connecting elements with the aid of a snap-in connection. Following this, the locking element is pushed onto exposed regions of the fastening bolts which are located outside of the connecting elements to secure the interlocking connection of the elements. On the whole, the above described fastening arrangement is based on the model of a chain lock, wherein all components including the locking element can be arranged submerged in an outer limiting surface for the fastening elements, so as to avoid any projecting parts for the guide arrangement.

With the above-described assembly, the locking element must again be fitted on in a direction parallel to the conveying direction. According to an alternative installation, the fastening bolts can initially be connected to each other via the locking element, e.g. embodied in the manner of a U-shaped yoke, and can then be inserted into the recesses in the connecting elements, wherein this can be advantageous in cases where the assembly is difficult.

In view of making available a satisfactory lateral rigidity for the interlocking connection between the connecting elements, at least one projection in a sectional plane that extends perpendicular to the conveying section may have an angular cross section, wherein the legs of the projection in that case can enclose a right angle, so as to provide a particularly high lateral rigidity in the directions extending perpendicular to each other.

According to another embodiment of the invention, the guide elements of the guide arrangement serve not only to guide the conveying member along the conveying section, but also to protect the conveying member against dirt and mechanical stresses. In that case, the guide elements and the connecting elements delimit a guide channel, open on one side, which extends along the guide section and functions to accommodate the conveying member. The guide elements and the connecting elements for this embodiment of the invention are essentially embodied C-shaped in a sectional plane extending perpendicular to the conveying section, wherein the opening in the conveying channel that extends continuously along the conveying section serves to allow functional devices attached to the conveying member to move through, for example clamps and grippers for gripping the products.

For the purpose of avoiding projections which favor the deposit of dirt in the guide arrangement region and which could pose the danger of injury to the operators and damage to the printed products conveyed along the conveying section, the guide elements and the connecting elements may have approximately the same cross sectional surfaces in a sectional plane extending perpendicular to the conveying section. Further, the outer limiting surfaces of the guide elements and connecting elements, which extend parallel to the conveying section, may be aligned once the guide elements are connected with the aid of the connecting elements.

During the operation of devices for conveying printed products along individual processing stations, a precise positioning of the printed products must be ensured to guarantee an optimum processing of the printed products in the processing stations. Considering these special requirements for the devices used to convey printed products, a further aspect of the invention calls for providing a guide arrangement for guiding the movement of a conveying member for conveying printed products, which comprises a number of transport members, along a preferably endlessly circulating conveying section with the aid of a plurality of guide elements extending along the conveying section for accommodating the conveying chain and delimiting the guide channel which is open on one side. The guide arrangement is essentially characterized in that on each guide element within the guide channel four or more guiding surfaces are arranged which extend along the conveying section and cooperates with four or more guiding devices arranged on individual chain links of the transport member, in particular the guide rollers. According to this aspect of the invention with a guide arrangement for conveying chains, for which the chain links are provided with four or more guiding devices, a separate guiding surface is provided for each guiding device to help prevent with particular reliability the tilting of the transport member relative to the guide arrangement. Of course, the correspondingly designed guide elements can also be connected interlocking with the aid of the above-described connecting elements, so as to ensure the special tilt-proof guidance of the transport member while simultaneously avoiding any excessive assembly expenditure.

To avoid a tilting of the transport member relative to the guide arrangement, it has proven useful if a second guiding surface of the guide elements, in cooperation with an adjacent second guiding device for the transport member, counteracts a pivoting movement of the transport member in a first pivoting direction relative to a pivoting axis extending parallel to the conveying section and parallel to a first guiding surface with an adjoining guiding device, meaning in a direction transverse and especially approximately perpendicular to the first guiding surface. The first and the second guiding surfaces are thus arranged in planes that preferably enclose a right angle, so that for the corresponding guiding devices of the transport member support surfaces are made available in two support directions extending transverse and in particular approximately perpendicular to each other.

The tilting safety of the guide arrangement can be improved further in that a third guiding surface, preferably extending parallel to the second guiding surface, in cooperation with an adjacent third guide arrangement of the transport member counteracts a pivoting movement relative to the pivoting axis in the first pivoting direction. For a guidance of the transport member without play, the third guiding surface is usefully positioned at a distance to the second guiding surface, in a direction perpendicular thereto. The transport member is thus guided without play by the second guiding devices fitting against the second guiding surface and the third guiding devices fitting against the third guiding surface, between these guiding surfaces, with respect to a direction extending perpendicular to the second and/or the third guiding surface. By providing two guiding surfaces, which preferably extend approximately parallel to each other, a guidance without play and simultaneously non-frictional is possible by using guiding devices in the form accordingly specified guide rollers that rotate in roller axes. For this, the second guide roller can be positioned at a distance to the third guide roller in a direction perpendicular to the first guiding surface. A tilting of the transport member, relative to the pivoting axis, can be counteracted in a first pivoting direction with the aid of the three guiding surfaces described so far. An especially precise guidance of the transport member along the conveying section is possible if a fourth guiding surface, cooperating with a fourth adjacent guiding device of the transport member, counteracts a pivoting movement of the transport member relative to a pivoting axis in a second pivoting direction, which extends counter to the first pivoting direction, and extends transverse, in particular approximately perpendicular, to the second guiding surface and preferably approximately parallel to the first guiding surface. As a result, the tilting or swiveling of the transport member, relative to a tilting or pivoting axis extending parallel to the conveying section, is counteracted completely.

Within the meaning of a guidance without play of the transport member in the guide arrangement, it has proven useful if the fourth guiding surface is positioned at a distance to the first guiding surface, in a direction extending perpendicular thereto, such that the transport member is guided without play by the fourth guiding devices fitting against the fourth guiding surface and by the first guiding devices fitting against the first guiding surface, relative to a direction extending perpendicular to the first and/or to the fourth guiding surface. This also permits a guidance without play with respect to displacements in a direction perpendicular to the first and the fourth guiding surfaces by using guiding devices in the form of guide rollers and avoiding a sliding friction of guide rollers on one of the guiding surfaces, wherein the first guiding surface can be positioned at a distance to the fourth guiding surface in a direction perpendicular to the second guiding surface.

For the purpose of obtaining a particularly compact design for the guide arrangements according to the invention, in a sectional plane extending perpendicular to the conveying section, the lines through a sectional plane extending perpendicular to the conveying section may be positioned in a straight line with the guiding surfaces which delimit a four-sided figure, in particular a rectangle and especially preferred a square. Of course, other types of cross-sectional shapes can also be used, for example curved ones.

The above-described arrangement of the guiding surfaces in the region of straight-line segments of the guide section makes particularly good sense because the transport member can be guided in this region without play and secured against tilting by using the above-described four guiding surfaces. In the region of the curved segments of the conveying section, attention must be paid that the misalignment occurring in the curved segments of the transport member and/or the guide elements arranged on the transport member does not result in excessive wear. It is useful in this connection if the guiding devices for the transport member are guided with slight play between the guiding surfaces of the guide arrangement. Such a guidance can be guaranteed if a fifth guiding surface is made available in the guide channel that extends at a distance approximately parallel to the first and preferably approximately coplanar to the fourth guiding surface, as well as a sixth guiding surface extending at a distance approximately parallel to the second and preferably approximately coplanar to the third guiding surface, as well as a seventh guiding surface extending at a distance approximately parallel to the third and preferably approximately coplanar to the second guiding surface and/or an eighth guiding surface extending approximately parallel to the fourth and preferably approximately coplanar to the first guiding surface.

With this arrangement comprising a total of eight guiding surfaces within the guide arrangement, a first guide roller for the transport member can be arranged between the first and the fifth guiding surface, a second guide roller of the transport member can be arranged between the second and the sixth guiding surface, a third guide roller of the transport member can be arranged between the third and seventh guiding surface, and a fourth guide roller of the transport member can be arranged between the fourth and the eighth guiding surface, wherein all guide rollers can be arranged with only slight play between the guiding surfaces, so as to minimize wear caused by a misalignment.

To obtain a low-noise and low-wear guidance of the transport member along the conveying section of the guide arrangement, the guiding surfaces of the connecting elements may be assigned to the guiding surfaces of the guiding elements transition to the guiding surfaces of the guiding elements. These guiding surfaces of the connecting elements can at least in part be adapter elements which can be secured, so as to be detachable, inside recesses of the connecting elements. The adapter elements simultaneously can form projections on the connecting elements which contribute to an interlocking connection of the connecting elements.

It has proven especially advantageous in that case if the guiding surfaces of two adapter elements, which are inserted into connecting elements positioned to fit against each other in the region of the contact surfaces, are arranged side-by-side in a direction extending parallel to the contact surfaces and perpendicular to the conveying section. As a result, a joint guiding surface segment is formed by two adjacent adapter elements. Avoiding excessive requirements for the production tolerances, a low-noise movement of the transport member can be ensured in the guiding surface segment if the side-by-side arranged guiding surfaces of the adapter elements are chamfered counter to each other and/or are angled in the conveying direction, such that they form a depression in the guiding surface segment of the side-by-side arranged guiding surfaces and jointly enclose an obtuse angle. A guide roller that rolls off a chamfered guiding surface on an adapter element transitions with low friction and avoiding any offsets to the guiding surface with opposite chamfer of the other adapter element, thus ensuring a guidance of the transport member which does not require a jump.

Materials used to ensure the low-noise and low-wear guidance oftentimes need to meet different requirements than materials used for ensuring a sufficient overall stability of the guide arrangement. It has therefore proven useful if at least one guiding surface is a running surface element which is attached, so as to be detachable, to a support region for a guide element. From the technical aspects of assembly, it has turned out to be useful if the support region takes the form of a T-shaped web, extending along the conveying section as well as in a sectional plane extending perpendicular thereto, and if the running surface element is embodied as a C-shaped profile which can be fitted onto the T-shaped web. In that case and once the connecting element is attached to the guide element, an adapter element that is secured in a connecting element can meet a dual function if it forms an end stop that counteracts a displacement of the running surface element along the conveying section, following the installation of the running surface element in the support region, wherein the running surface element which is fitted onto the web can span a web-type support extension along the conveying section which extends over a portion of the length of the connecting element.

For the purpose of separating the guide function of the transport member on the one hand from the operating function of the transport member on the other hand, it has proven useful if the guide elements in the guide arrangement are provided with a drive channel which is preferably arranged on the side facing away from the opening that extends in conveying direction of the guide channel, accommodating the guiding surfaces, wherein this drive channel can be open in the direction toward the guide channel, so that an open recess is formed between the guide channel and the drive channel along the conveying section which functions to ensure the movement sequence, for example with a drive element. The guide channel and the drive channel can be delimited by side walls which are aligned extending approximately parallel to each other and which are connected to each other via a connecting wall on the side facing away from the guide channel opening. The connecting wall delimiting the conveying channel on the side facing away from the opening in the guide channel can be provided in this case with at least one opening, extending along the conveying section, for introducing a drive element, such as a drive chain, into the drive channel.

The arrangement according to the invention for conveying printed products comprises an inventive guide arrangement and a transport member which can be moved along this guide arrangement and functions to convey printed products, wherein the transport member can be positioned inside the guide channel for the guide arrangement.

As explained in the above, the chain links of the conveying member on a corresponding conveying device can generally be driven continuously circulating along a conveying section. To ensure the mobility of the chain links along the conveying section, these must be connected articulated, generally such that they can pivot independently around two axes. The conveying section can have a length of 100 m or more. The assembly of the guide rail arrangements and the chain links is therefore correspondingly involved and expensive, wherein the articulated connection between the individual chain links must be guaranteed over the complete length of the conveying member.

The following documents are to be discussed in further detail herein for a better understanding of the subject matter of the invention.

For the conveying chains and/or conveying members described in the Swiss patent document CH 588 647 A5, the assembly of chain links, connected to each other via ball joints, is to be made easier in that sockets and loose bodies are embodied as equatorial ball segments. The idea of using equatorially separated ball segments is also mentioned in the Swiss patent documents CH 646 762 A5 and CH 656 683 A5. However, the design discussed therein for the articulated connections between individual chain links does not noticeably facilitate the installation of the conveying chains on or in the conveying rails.

A certain simplification results from the assembly of the conveying chain in accordance with the disclosure of Swiss patent document CH 593 187 for which chain links of plastic are detachably connected via pivoting axes and hubs oriented transverse to their longitudinal direction and for which additional parts are detachably attached to fastening elements for the chain links. However, considerable problems are also encountered with the conveying chains described in the aforementioned document, owing to the assembly of the chain links on and/or in the guide rail arrangements and/or the guide rails. The assembly is made somewhat easier with conveying chains as disclosed in U.S. Pat. No. 4,638,906 for which the individual chain links can be detached by rotating them around an axis of rotation which extends parallel to the conveying direction. However, this arrangement requires providing corresponding openings in the guide rail. The assembly of a conveying chain as described in the European patent document EP 1 832 532 A2 is to be made easier by providing a bearing housing consisting of two housing parts which extend across a ball-shaped bearing body, so as to form a ball bearing. The idea of dividing the bearing body into equatorial planes is again taken up in this document.

Finally, cost-effective conveying chains are disclosed in European patent document EP 1 557 387 A1 in that at least two clamps or grippers are attached to each chain link of the conveying chain for gripping respectively at least one printed product.

From the above explanation of known conveying chains for conveying printed products it follows that numerous problems can be encountered during the assembly and installation of such conveying chains along a conveying section that is predetermined by a guide rail arrangement while simultaneously making sure that the conveying chain has sufficient mobility along a curved conveying section.

An embodiment of a transport member used with particular advantage for the purpose of the invention, is characterized in that at least two chain links, installed successively one behind the other along the conveying section, can be connected rigidly but detachably in order to form a functional arrangement. The rigid connection between the individual chain links can be independent of the otherwise required articulated connection between individual chain links and can therefore be achieved with simple installation means even within the guide rails. As a result, the installation of these conveying chains is simplified considerably by the rigid connection of individual chain links within the guide rails which can be installed successively in the conveying direction.

The otherwise required mobility of the transport member along a curved conveying section can also be ensured with conveying chains of this type if, in addition to forming a functional arrangement of rigidly connected chain links, chain links are mounted articulated and successively along the conveying section to form an articulated arrangement. In the process, two successively installed functional arrangements along the conveying section can be connected to each other articulated to form an articulated arrangement. For the assembly of such conveying chains, conveying chain segments comprising a number of articulated arrangements and/or functional arrangements can be pre-assembled and can thus be introduced into a guide rail arrangement according to the invention, which also consists of pre-assembled components. For this, components comprising conveying chain segments and guide elements can also be pre-assembled. Adjacent chain links of the transport member can then be rigidly connected, so as to form a functional arrangement of an endlessly circulating conveying member. The installation is thus simplified on the whole since the articulated connections, required for ensuring the functional safety of the conveying member, can already be pre-assembled during the production stage of the conveying member and/or the transport members at the production plant and only a rigid connection between individual chain links must be formed on location during the installation.

In view of the different functions to be met by the chain links, such as the drive function and the guide function, it has proven favorable if the functional arrangement formed with the rigid connection between two chain links comprises a chain link embodied as a first functional link and a different chain link embodied as a second functional link. In this way, individual functions can be assigned to individual chain links which, on the whole, results in a functional improvement and/or an improvement in the operational reliability of the conveying devices according to the invention. In order to form a rigid connection between the individual functional links of a functional arrangement, it has proven advantageous if these functional links interlock in a connecting region, in particular if they are snapped together, wherein the interlocking connection can be secured via a detachable connection.

The connecting regions for the individual functional links can be provided with hook-type projections that extend transverse to the conveying direction and interlock for the connection. The connecting region of one of the functional links can extend past the connecting region of the other functional link in conveying direction, so as to produce a secure connection. A particularly simple embodiment of the connecting link is provided with a screw bolt that extends through one of the functional links and is screwed into a thread in the other functional link, wherein the bolt head of the screw bolt, which is arranged on the side opposite the thread, usefully rests at least indirectly against a functional link.

For the installation of conveying devices according to the invention, the individual functional links of a functional arrangement can thus initially be positioned in the connecting region through the interlocking engagement and can then be locked in place in this position with the connecting link. It has turned out that the installation of the conveying devices according to the invention can be realized particularly easily if the axis of the screw bolt extends transverse and in particular perpendicular to the conveying direction since this arrangement provides an especially large amount of space for installation options, in particular installation openings, in guide-rail arrangements. Slot-type openings of this type, which extend in the conveying direction of the guide-rail arrangement, are already required in guide rail arrangements for the functional devices used for transporting the printed products, e.g. grippers and clamps, which extend in a direction transverse to the conveying direction, starting with the transport member, and which must be freely accessible outside of the guide rails.

For this arrangement of the functional devices, it has proven to be useful in view of the desired simplicity of installation if, on the side facing away from the thread, the screw bolt used for connecting the functional links extends through a connecting device for connecting a functional device that is oriented transverse to the conveying section, such as a gripper or a clamp or the like. The connecting device as a component of the functional device in the process can be fixedly connected thereto. In view of the frequently desired high modularity of systems provided with conveying devices according to the invention, it has proven to be advantageous if the connecting device is an adapter for connecting the functional device to the transport member, wherein different types of connecting devices, e.g. adapters, can be used for connecting different functional devices.

As previously mentioned in the above, using different types of functional links is particularly helpful in view of the desired optimization of the individual functions of the transport member. It has proven useful in this connection if the first functional link comprises a coupling region that is designed for connecting the transport member to a driving mechanism and if the second functional link, meaning the chain link, is provided with a guiding device embodied for guiding the transport member along a guide-rail arrangement. This separation between the conveying function on the one hand and the guide function on the other hand results in an improvement in the operating reliability of conveying chains according to the invention since standard driving mechanisms act in the region of the guiding device upon the conveying chains, e.g. as described for the chain drive in European patent document EP 0 540 866 A2, so that the guiding devices of the guide arrangements are subject to increased wear, owing to the simultaneous drive function.

The standard drive used for the transport members in guiding devices furthermore requires an intervention in the conveying device in the region of the guide rails and/or the guide rail arrangement and in many cases also the looping around of a drive element by the transport member. With the separation according to the invention between the coupling region for the conveying device on the one hand and the guiding device on the other hand, the chain drive can be realized completely independent of the guide function and the conveying function for the printed products. A further optimization of the function is thus achieved which is additionally supported by the arrangement of the coupling region in the drive channel for the guide arrangement and the arrangement of the guiding device inside the guide channel.

In view of providing a particularly large structural space for the functional devices to be connected to the transport member, it has proven to be useful if the region for connecting the driving mechanism is arranged on the functional arrangement side that is opposite the bolt head for connecting the functional device, if applicable via a connecting device. Thus, if the functional devices in the form of grippers, lamellas and the like are suspended below the transport member, the driving mechanism can be arranged above the transport member and cooperates with the coupling regions which in this position project upward and away from the transport member.

Structurally, the coupling region can be realized particularly easily if it is embodied in the manner of a comb, with teeth that extend transverse, in particular approximately perpendicular, to the conveying direction. The chain studs of a drive chain can engage in the gaps between these comb teeth for the purpose of driving the transport member. A looping around a drive wheel by the transport member is not necessary in that case. Rather, the transport member can also be driven along a straight-line segment of the conveying section. However, it makes sense in that case if the transport member is supported on the side opposite the conveying device on and/or in a guide rail arrangement. For this purpose, the guiding device of the second functional link is usefully provided with at least one, preferably two, three or more guide rollers, positioned rotating with respect to corresponding roller axes. Thus, each roller may make contact with a guiding surface of the guide arrangement and/or is arranged between two guiding surfaces of the guide arrangement. The desired functional separation between the drive function on the one hand and the guide function on the other hand can be achieved particularly effectively if all guide rollers are arranged on the side facing the connecting device used for connecting a functional device, such as a gripper, in the region where the driving mechanism is connected, so that the coupling region is freely accessible outside of the guide rollers.

Even though the guide rollers can also be arranged on the second functional link, offset relative to each other, along the conveying direction, it has proven useful in view of making possible a compact configuration for the conveying devices according to the invention if two guide rollers are positioned rotating with respect to a joint first roller axis that extends transverse and in particular perpendicular to the conveying section and/or the conveying direction, wherein two additional guide rollers are positioned rotating with respect to a joint second roller axis, relative to a plane extending transverse, in particular approximately perpendicular, which is spanned by the conveying direction and the first roller axis. To obtain a symmetrical configuration, the guide rollers can be arranged on the sides of a square, with the roller axes extending along its median. The respective roller axes usefully extend parallel to two, three or more guiding surfaces of the guide arrangement.

Within the framework of the invention, it has proven particularly advantageous in view of providing an extremely reliable guide function for guide arrangements which can have curved regions in all spatial directions, if the guiding device comprises at least four guide rollers, wherein respectively two guide rollers are positioned rotating with respect to a joint roller axis and the two roller axes, in turn, are arranged perpendicular to each other in a single plane. It has also proven especially useful for the purpose of a compact configuration if at least one guide roller is positioned rotating on a guide pin for the second functional link because the desired guiding function can thus be realized without continuous physical roller axes, wherein the rotating positioning relative to a joint geometric roller axis can still be ensured even if additional functional regions of the chain link are arranged between individual regions of the second functional link which serve the rotating positioning of the guide rollers, such as guide pins.

In the same way as with conventional conveying chains, the chain links of the articulated arrangement for the conveying chains used in conveying devices according to the invention can be pivoted, relative to each other, around two transverse, in particular perpendicular, extending pivoting axes to ensure the mobility along the curved sections of the guide, which are determined by its radius of curvature. For this, the chain links of the articulated arrangement can be connected by using a ball-joint device provided with a ball segment and a ball cup segment. For the purpose of a particularly compact configuration of the conveying devices according to the invention, it has proven useful if the ball segment and the ball-cup segment are inserted in a region in one of the chain links and, together with this insertion region, are contained in a holding region of the other chain link for the articulated arrangement, wherein this holding region can also be arranged between the guide pins used for the rotating positioning of the guide rollers.

To ensure a secure connection between the chain links of the articulated arrangement, a connecting bolt that extends through the holding region of the other chain link can also extend through the ball segment and the ball-cup segment. The insertion region on the one chain link for the articulated arrangement which supports the ball segment and the ball-cup segment is thus initially inserted into the holding region of the other chain link. The connecting bolt is then guided through an opening extending through the ball segment, the ball-cup segment and the holding region, so as to produce a connection between the chain links for which the ball segment can be secured with the aid of the bolt, relative to the chain links comprising the holding region, while the ball-cup segment together with the insertion region of the respective chain link can be pivoted around the ball segment, so as to make possible a pivoting of the chain link which contains the insertion region, relative to the chain link with the holding region.

To achieve an especially high resistance to wear when using the conveying chains according to the invention, it has proven advantageous if the ball segment is composed of a metal, wherein the ball-cup segment can be composed of a plastic with low frictional coefficient, such as a polyamide and/or a Teflon-containing plastic. For the purpose of a particularly simple manufacturing of the ball segment, it is effective if the insertion region is embodied form-locking and/or material-locking with the ball cup segment, such that the insertion region together with the ball-cup segment is positioned rotating, relative to the ball segment. The insertion region can be formed, for example, through injection-molding around the ball-cup segment region, using a preferably fiber-reinforced plastic. The ball-cup segment can be formed with pre-assembled cup halves which are fitted around the ball segment, wherein the end faces of the cup halves which face each other can be provided with centering pins and corresponding centering openings. Within the meaning of guiding the pivoting movement of the chain links, relative to the axis of the bolt connecting the insertion region with the holding region, the insertion region can be embodied as a circular disk segment of a circular disk surrounding the bolt axis, wherein the limiting surface of the holding region that is facing the bolt axis can also be embodied as cup-type circular disk segment.

Conveying chains according to the invention can be produced especially easily while avoiding an excess number of different structural components and the corresponding storage, if a chain link of the articulated arrangement is embodied as the first functional link of the functional arrangement and/or if the other chain link of the articulated arrangement is embodied as the second functional link of the functional arrangement.

With this embodiment, the connection between the individual chain links of the articulated arrangement can be realized securely and reliably while avoiding any influence on the connection between the driving mechanism and the transport member, provided the insertion region comprises a projection on the first functional link which extends transverse, preferably approximately along the conveying direction, to the bolt for connecting the functional links of the functional arrangement. The insertion region in the shape of a circular disk can be arranged below a plane spanned by the conveying direction and the bolt axis, so as to ensure sufficient rigidity under stress, caused by the loads arranged thereon which normally are attached below. For this, at least one roller axis can extend through the holding region, wherein the connecting bolt axis extends approximately parallel, preferably co-linear, to the second roller axis while the first roller axis is arranged in the plane for the insertion region in the form of a the circular disk segment. In that case, the insertion region is arranged between the guide pins for the second functional element on which the guide rollers are positioned rotating, relative to the first roller axis and/or the second roller axis.

A transport member for use according to the invention can be made available in the form of successively following articulated arrangements and functional arrangements if respectively one first chain link is arranged between two second functional links of the second chain link, wherein the first chain link is hinged on one side to one functional link of the second chain link and on the other side is connected rigidly to the other functional link of the second chain link.

BRIEF DESCRIPTION OF THE DRAWINGS

The invention is explained in the following with reference to the drawings to which reference is expressly made concerning all details essential to the invention and not further emphasized in the description. All elements which are not essential for the direct understanding of the invention have been omitted. The same elements are provided with the same reference numbers in the Figures.

FIG. 11 shows end elevation of a running surface element.

FIG. 12 shows an end elevation of the running surface elements for an adapter element.

FIG. 13 is a three-dimensional representation of the adapter element.

FIG. 13a shows a side elevation of the adapter element with a chamfer at an angle.

FIG. 17 shows a side view of a guide arrangement having a twisted course.

FIG. 18 shows a perspective view of a guide arrangement along a curved segment extending around a horizontal axis of curvature.

FIGS. 19a, 19b and 19c show side, bottom and perspective views, respectively, of a curved guide element extending around a vertical axis of curvature for a guide arrangement according to the invention.

FIG. 27 is a side view of the first chain link for a transport member.

FIG. 28 is a sectional view of the first chain link according to FIG. 27;

FIG. 29 is a sectional view of a connecting bolt together with ball-cup segment.

DETAILED DESCRIPTION

Figure 1:
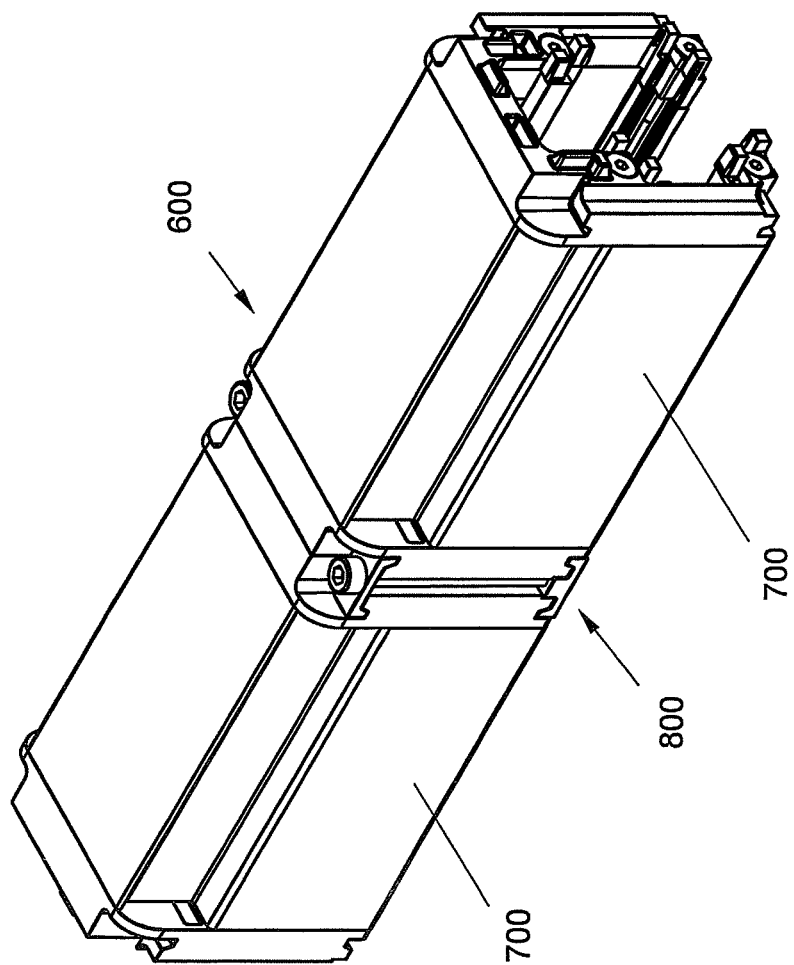
FIG. 1 shows a perspective view of guide arrangement consisting of guide rail elements.

A guide rail arrangement 600 is illustrated in FIG. 1 and comprises guide rail elements 700 and connecting elements 800. The guide rail arrangement essentially extends in a straight line along a conveying section. However, the straightness shown herein need not be understood to be absolute, nor does it apply to a complete conveying section. Straight sections can without problem be followed by curved passages extending in a plane or in a three-dimensional space, wherein twisted conveying sections in principle can also exist. The guide rail elements 700 form individual channel sections which are connected via oppositely-arranged end faces of the guide rail elements 700. A detachable connection may be provided for this which offers the highest possible flexibility. As can be seen in FIG. 1, the guide rail elements 700 are respectively provided with connecting elements 800 on the end faces, wherein these will be described in further detail in the following Figures. The connecting elements 800, attached to the oppositely-arranged end faces of the guide rail elements 700, respectively consist of flanges that face away from each other on the end faces of the guide rail elements 700, wherein these flanges engage in an interlocking manner via mirror-inverted raised and depressed contact areas. A connecting element of this type is shown in further detail in FIGS. 3-5. The two flanges are connected with a screw connection, wherein for a better understanding it is recommended to also use FIGS. 6 and 7 which clearly show the mirror-inverted, interlocking contact surfaces.

Figure 2:
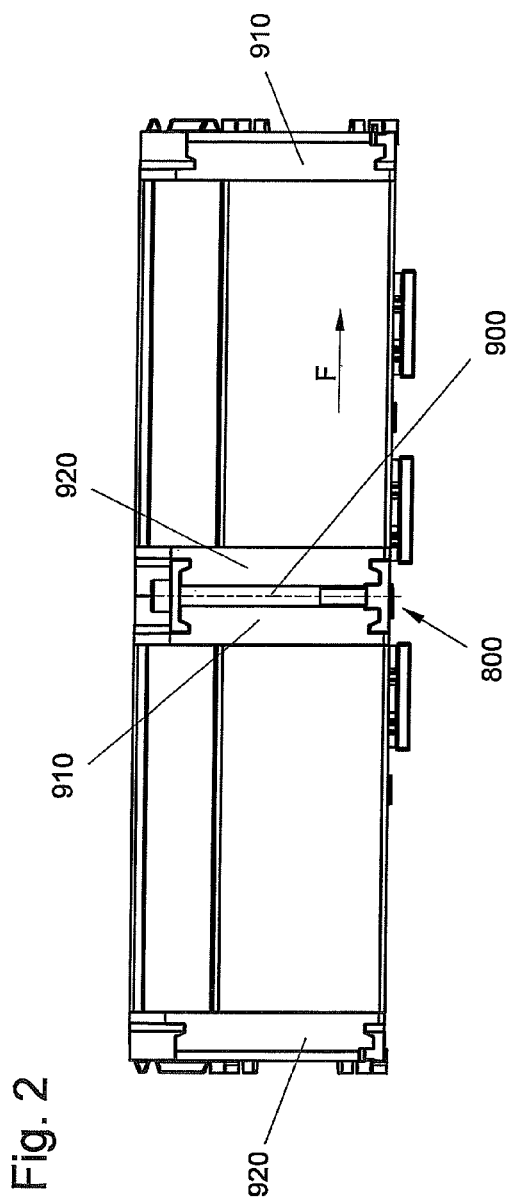
FIG. 2 shows a side elevation view of the guide arrangement according to FIG. 1.

FIG. 2 represents a longitudinal section through two joined guide rail elements 700, including the two flanges 910, 920 which are respectively attached to the end faces. The interlocking connection between the two adjacent flanges 910, 920 is then realized with a screw connection 900, wherein this will be discussed in further detail later on.

Figure 3:
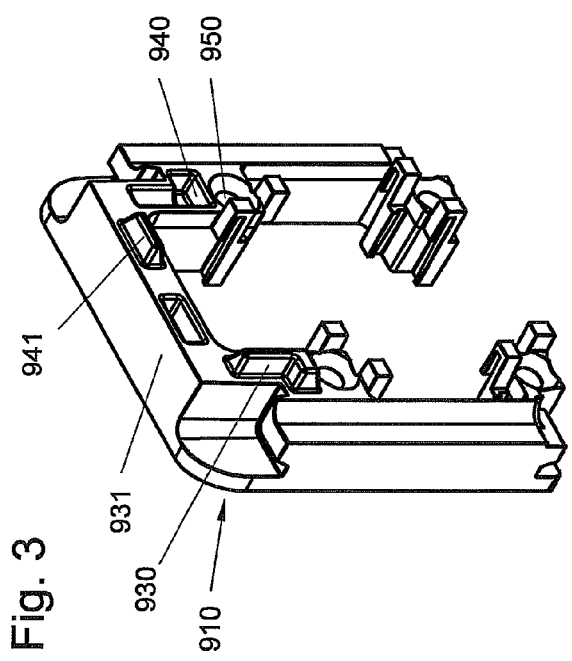
FIG. 3 shows a three-dimensional view of a connecting element.

FIG. 3 shows the connecting element in a three-dimensional view which is helpful for understanding the structural design. This Figure shows that a projection 930 that is formed onto a contact surface engages in a depression 940 in the oppositely-arranged contact surface of the attached flange. The projection 930 has a three-dimensional vertical guidance which is expanded with a horizontally projecting nose. The yoke surface of the flange furthermore comprises two centering means 931 and 941 which also behave as described, meaning they also realize a guiding and centering function. The projections 930, 941 as well as the depressions 940, 931 are embodied with a tapered shape on all sides, thereby making it possible to simplify the assembly and simultaneously achieve an optimal centering function. As previously mentioned in the above, the respective connecting element 910 or 920 is attached by screw connection 950 to the respective guide rail element 700, for example with the aid of countersunk screws which do not come in contact with the stop surface for the axial positioning.

Figure 4:
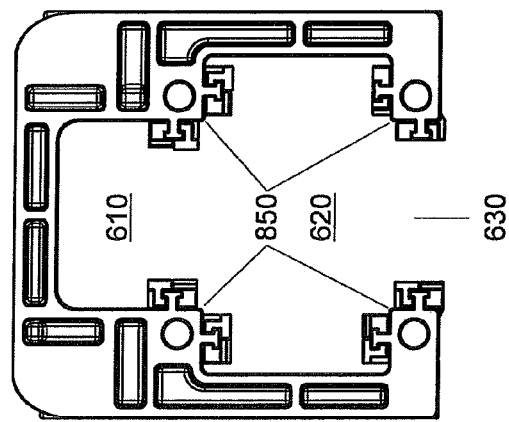
FIG. 4 shows a vertical section of the connecting element according to FIG. 3.

FIG. 4 depicts a frontal area of the flange 910 according to FIG. 3. The through openings on the inside essentially correspond to the channel-type embodiment of each guide rail element (see FIGS. 1 and 10) over the complete length, meaning the connecting element 910 as well as 920 and the guide rail element 700 are provided with the same through openings. As a result, the following description of the flange can also be transferred to the guide rail element 700.

Figure 5:
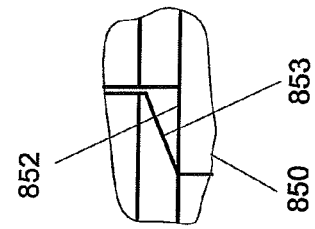
FIG. 5 shows a two-dimensional representation of an adapter element with chamfer.

The guide arrangement 600 according to the invention consequently comprises a guide channel 620 and a drive channel 610. The guide channel 620 is provided with a slot-type opening 630 on its side facing away from the drive channel 610 through which the functional devices 350 of the drive chain 10 (see also FIG. 16) can exit from the guide channel 620. According to FIG. 4, adapter elements 850 which delimit the guide channel 620 can be installed detachably inside the flange 910, 920. As a result of these adapter elements 850, a smooth transition is ensured between the running surfaces of the flange 910, 920 and the adjacent guide rail element 700. This is achieved with running surface segments 852 on the adapter elements 850 that are chamfered in counter directions and/or are angled in conveying direction F, as shown in FIG. 5.

Figure 6:
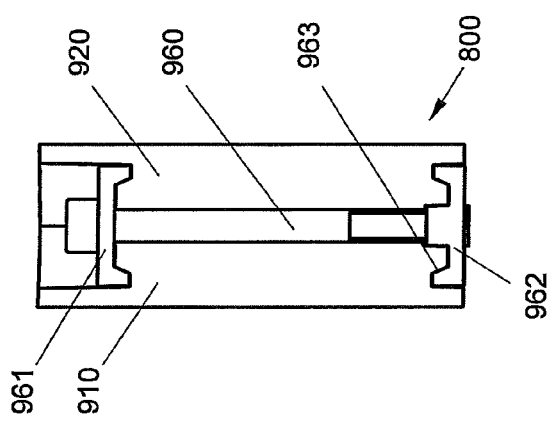
FIG. 6 is a vertical sectional view showing a technique for connecting two flanges.
Figure 7:
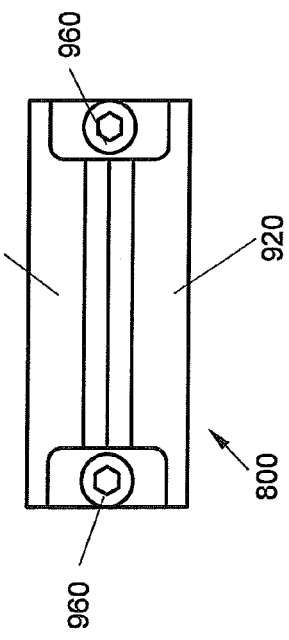
FIG. 7 is a top elevation of FIG. 6 illustrating the technique used for connecting two connecting elements.

FIGS. 6 and 7 show the design of the connecting elements 800 which connect the flanges 910, 920 and the guide rail elements 700 which are fixedly connected to these flanges, in an interlocking manner to form a guide rail arrangement 600. For this purpose, two headless screws 960 are used (see FIG. 7) which are effective in the vertical direction on both sides of the flanges to be connected. The headless screw 960 is operatively connected on the top and bottom with two brackets 961, 962 and is screwed in starting from the top, wherein the lower bracket 962 comprises a thread for tightening the headless screw 960. In the screwing direction, the two brackets 961, 962 respectively have a dovetail profile 963 which grip identically embodied dovetail sections of the flanges and have a mirror-inverted effect. During the tightening of the headless screw 960, the dovetail profiles 963 generate a horizontal force that is counter-directed toward the two guide rail elements 700, thereby ensuring that the contact surfaces of these elements press firmly against each other to create a secure and seamless connection. It is advantageous in that case if the inclination on the dovetail profiles do not described a self-locking angle.

Figure 8:
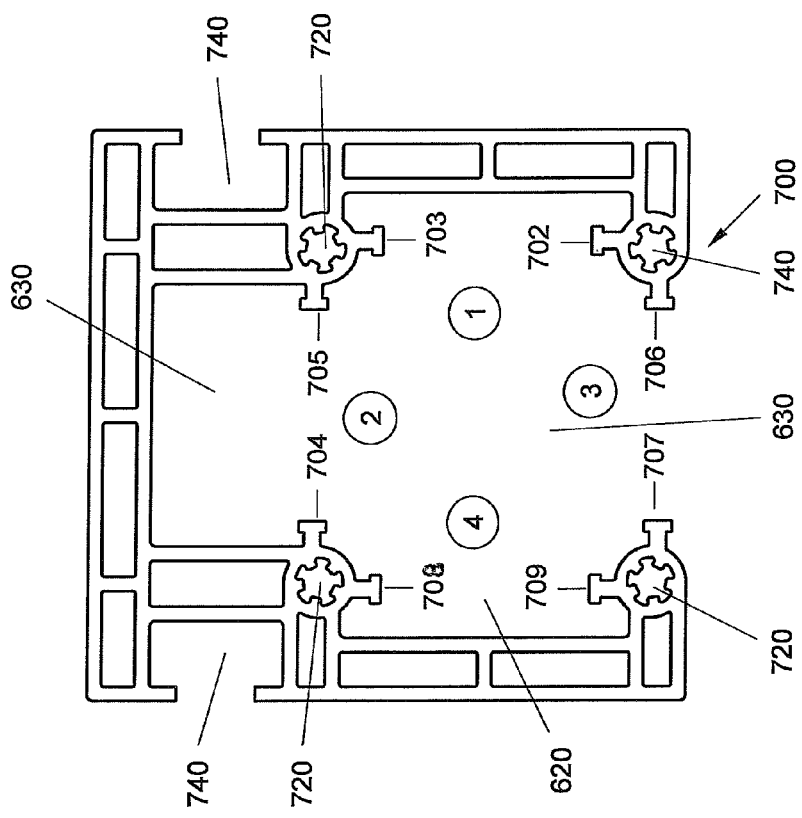
FIG. 8 is a vertical section of a guide rail element shown in FIG. 10.

FIG. 8 shows a profile for a guide rail element 700 used for a guide rail arrangement 600 according to the invention.

It should be emphasized here that only one example for such a profile is shown and that in some cases changes can be made to the outer geometry as well as the design of the profile inside which, however, do not affect the basic philosophy of the guide arrangement.

Of course, the inner design of the flange and that of the guide rail elements should basically be in conformity if the guide arrangement is to meet its defined function. Thus, if different profiles for the flange and the guide rail element are shown in the following, this is designed to show that the geometries can vary over a wide range. The guide rail element 700 delimits the guide channel 620 and the drive channel 630.

Figure 15:
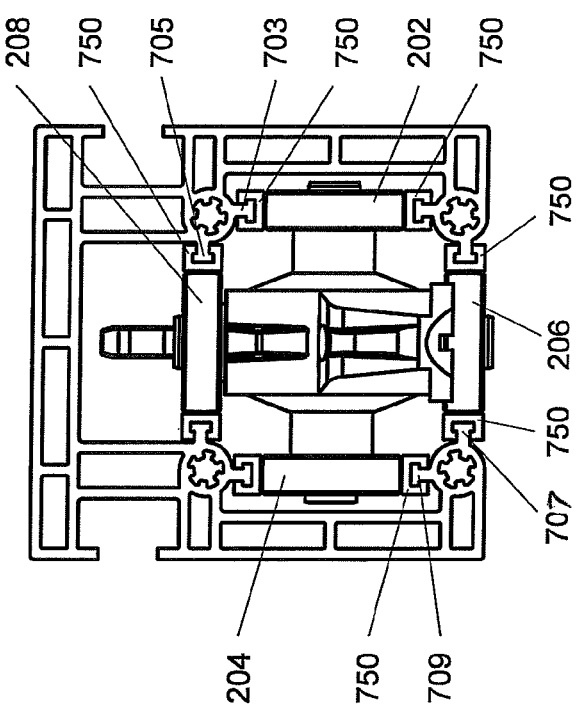
FIG. 15 is a sectional view through a different guide arrangement provided with the same transport member during the operation, wherein the roller guidance in this case is configured different from the one shown in FIG. 14.

FIG. 8 shows that the guide channel 620 has an essentially square cross section, wherein on the edges of the guide channel 620 respectively two support regions 702 to 709 are provided for the running surface elements 750 (see also FIG. 15). The support regions 702 to 709 are substantially embodied as T-profiles extending along the conveying section, so that the running surface elements 750 of the type as shown in FIG. 15, having essentially C-shaped profiles, can be fitted on so as to be detachable.

Figure 9:
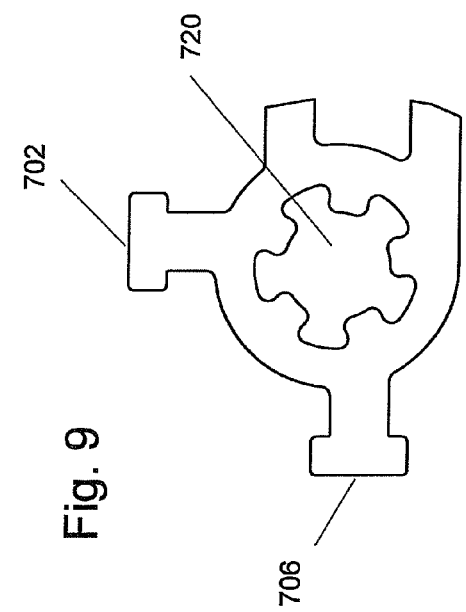
FIG. 9 is an enlargement of the support regions for the guide rail elements shown in FIG. 8.
Figure 10:
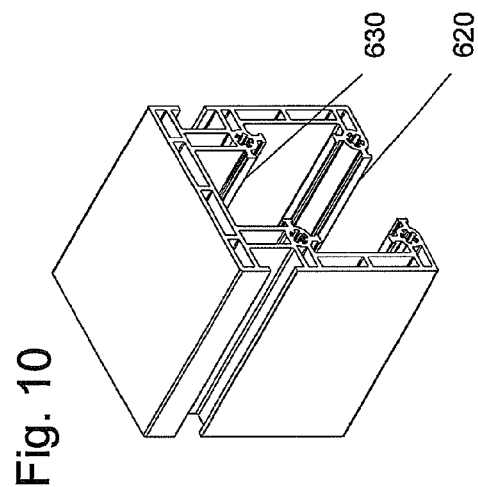
FIG. 10 is a three-dimensional representation showing the guide rail elements disposed inside the guide channel.

As can be seen in FIGS. 9 and 10, a recess 720 that extends along the conveying section is provided at each corner of the guide channel 620, between two support regions 702, 706; 703, 705; 704, 708 and/or 707, 709. Bolts are screwed into these recesses for attaching the connecting elements 800 to the guide rail elements 700. The bolts simultaneously stabilize the position of the support regions 702 to 709. Owing to the spatial nearness between the recesses 720 that accommodate the bolts and the support regions 702 to 709, a particularly precise orientation of the support regions 702 to 709 is ensured, relative to the support regions of adjacent connecting elements 800.

Channels 740 which are open toward the outside are arranged in the limiting walls on the side of the drive channel 630. These channels can accommodate bolts which are accessible from the outside and extend with their bolt axis in the conveying direction. These bolts serve to attach the guide rail elements 700 to each other via the flanges 910, 920. With respect to the connecting elements 800 and the manner of fastening these, reference is made to the description in FIGS. 6 and 7.

Thus, if the connecting element according to FIGS. 3-7 is connected to the guide rail element according to FIGS. 8-10, it only necessary to ensure that the axial connection between the two is guaranteed, meaning that the screw connections 950 between the connecting element and the guide rail element are aligned. The recesses 720 (see FIG. 8), for example, can thus be used easily and can be designed correspondingly for this purpose. Of course, other connecting options between the two elements can also come into play, for example by realizing a circumferential anchoring in place of an axial screw connection. It must be taken into consideration for this that the guide rail elements 700 in the end must also be connected to each other via the flanges.

The running surface elements 750 are illustrated in FIG. 11. The running surface elements 750 can be embodied with different wall thicknesses if the T-shaped recesses are embodied uniform, so as to ensure the desired guide conditions for the guide rollers of the transport member accommodated inside the guide channel 620, as explained below with the aid of FIGS. 14 and 15.

FIGS. 12, 13, 13a show the adaptor element 850 (see also FIG. 5) to which running surface segments 852 are attached, so as to be detachable, to the basic body 854 of the adapter elements 850. The running surface segments 852 maintain the desired guide characteristics even in the region of the adapter elements 850. As can be seen, an acute angle α (see FIG. 13a) on the running surface segments 852 encloses the running surfaces 853 in the conveying direction F, so that the counter-directed chamfering of the running surfaces shown in FIG. 5 can be achieved.

Figure 14:
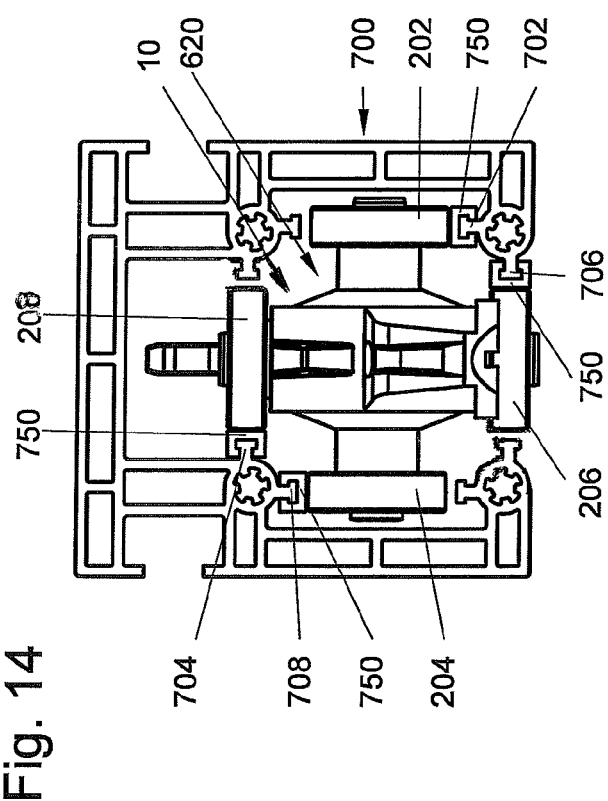
FIG. 14 is sectional view of a guide arrangement with a transport member during the operation.

FIG. 14 shows a section through of a conveying device according to the invention which is provided with a transport member 10 (see also FIG. 16) that is positioned in a straight-line section of a guide arrangement according to the invention, wherein the underlying profile corresponds to a guide rail element as shown in FIGS. 8-10. In the straight-line section, the guide roller 202 of the transport member is positioned on a running surface element 750 that is fitted onto the support region 702 of the guide rail element 700. The guide roller 208 of the transport member fits against a running surface element 750 that is fitted onto the support region 704. The guide roller 204 rests against a running surface element 750 that is fitted onto the support region 708 and the guide roller 206 fits against a running surface element 750 which is fitted onto the support region 706. The wall thicknesses of the running surface elements 750 are selected such that transport member resting with its guide rollers 202 to 208 against these elements is guided without play inside the guide channel 620 of the guide rail element 700. The spatial arrangement of the running surface elements 750 thus ensures a non-frictional guidance of the transport member in the guide rail element 700.

FIG. 15 is a sectional representation of a conveying device according to the invention, showing a curved region of the guide arrangement which extends along a sectional plane that runs perpendicular to the conveying direction. In the curved region of the guide arrangement, corresponding running surface elements 750 are also fitted onto the support regions 703, 705, 707 and 709 in addition to the other running surface elements 750. The wall thicknesses of the running surface elements 750 in the curved regions are selected such that the guide rollers 202, 204, 206 and 208 are accommodated with only a slight play between the support regions 702 and 703 and/or 704 and 705 and/or 708 and 709 and/or 706 and 707. A reduction is thus also possible in the wear on the running surface elements 750 and the guide rollers 202 to 208, which is caused by a possible misalignment.

For a better understanding of the guide arrangement and its mode of operation, both FIGS. 14 and 15 also show a transport member in a two-dimensional representation. This transport member, still to be described in further detail below, represents an advantageous embodiment. That is to say, the guide arrangement described herein can also be operated without problem using different transport members. However, it should not be disregarded that using the herein described guide arrangement with the herein illustrated transport member offers great advantages, but a coupling of the two is not an absolute prerequisite.

Figure 16:
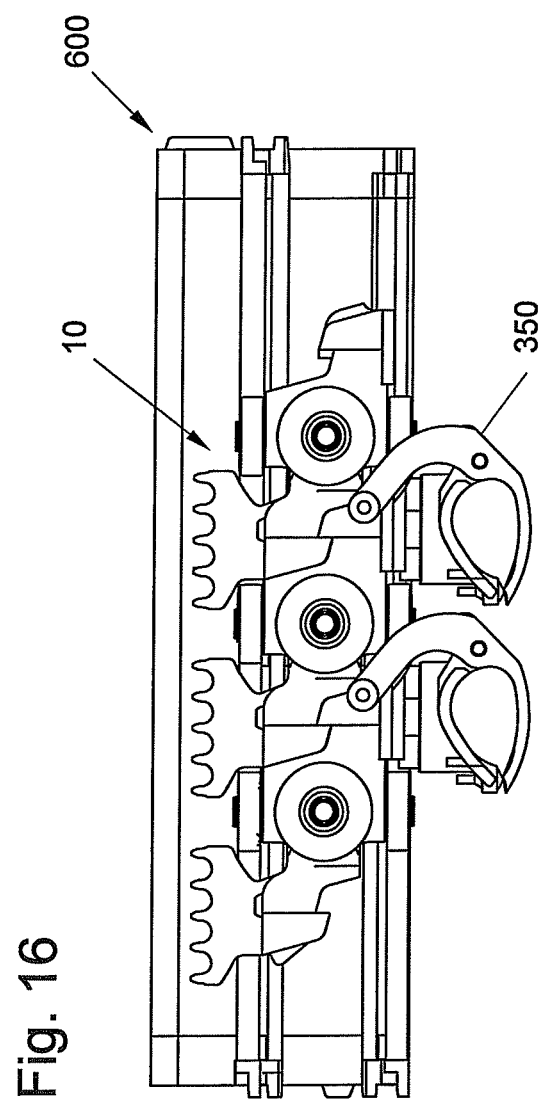
FIG. 16 is a side elevation view of a guide arrangement with a transport member that is provided with grippers, attached to the underside, for the transport of printed products.

According to FIG. 16, gripper-type functional devices 350 can be attached via connecting devices 310 (shown in FIG. 26) to the functional links of the transport members belonging to the transport member 10, wherein the connecting devices can extend through the recess 630 in the conveying channel (see FIG. 4).

In connection with this FIG. 16, the guide rail arrangement 600 shown herein can also meet other functions in addition to the one illustrated here. For example, essentially flat plates, not shown further in the drawing, can be arranged on the underside of the chain link 200 (see FIGS. 24, 25) in place of the grippers 350 that are shown, wherein a guide pin 216 (see FIGS. 24, 25), for example, would be suitable as an anchoring point. If each chain link 200 is provided with a plate, wherein the plates are matched to each other, a cohesive surface is obtained. These plates can also be composed of different types of materials and can act in the manner of lamellas. The use of this product-conform transport surface is realized by pivoting the complete guide rail arrangement 600 by 180°, so that the chain drive 530 (see FIG. 30) is effective via the first chain link 100 on the underside. If these plates are installed in the manner of lamellas and in an overlapping arrangement, relative to each other, the plates are also well suited to bridge curved or twisted sections along the transport path. This expanded use option for the guide rail arrangement 600 is a design variant according to the invention.

According to FIG. 17, the guide rail elements can have a torsional design, relative to a torsion axis extending parallel to the conveying direction, wherein connecting elements 800 can be arranged at both end faces of the guide rail elements 700.

According to FIG. 18, the guide rail elements 700 can be embodied so as to curve around a vertical axis of curvature, wherein the opening 630 (see FIG. 8) through which the functional device 350 extends (see FIG. 16) can face the axis of curvature.

Finally, the guide rail elements 700 according to FIG. 19 can also be embodied to extend around a horizontal axis of curvature, wherein the opening 630 through which the functional devices 350 extend can be embodied in a lower limiting surface of the guide rail elements 700. Connecting elements 800 are again attached to oppositely-arranged end faces of the guide rail elements 700.

An exemplary embodiment of a transport member is explained in further detail in the following, wherein this transport member is particularly suitable for use in connection with the above-described guide member.

Figure 20:
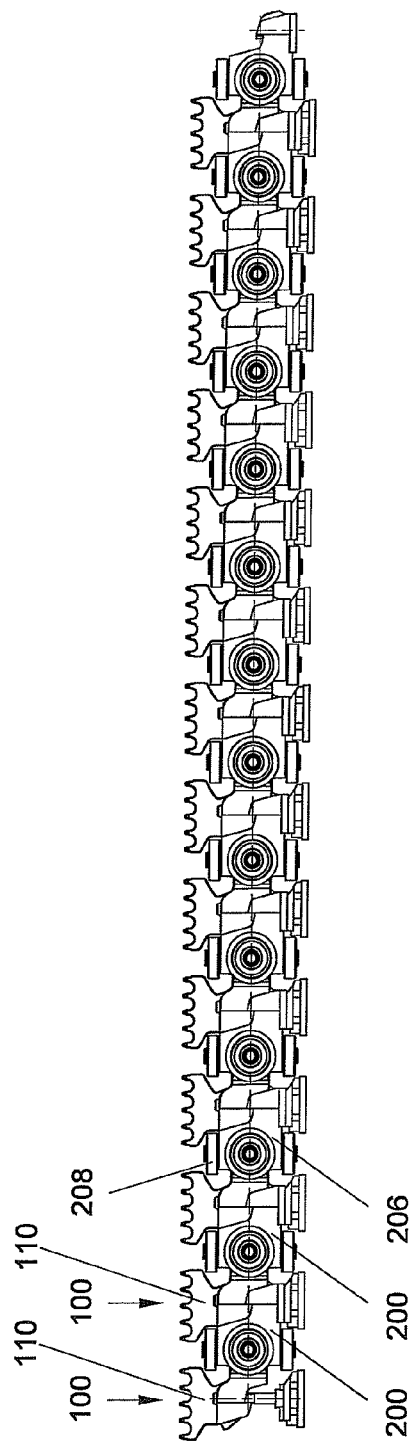
FIG. 20 is a side view of the conveying member configured with a number of transport members.
Figure 21:
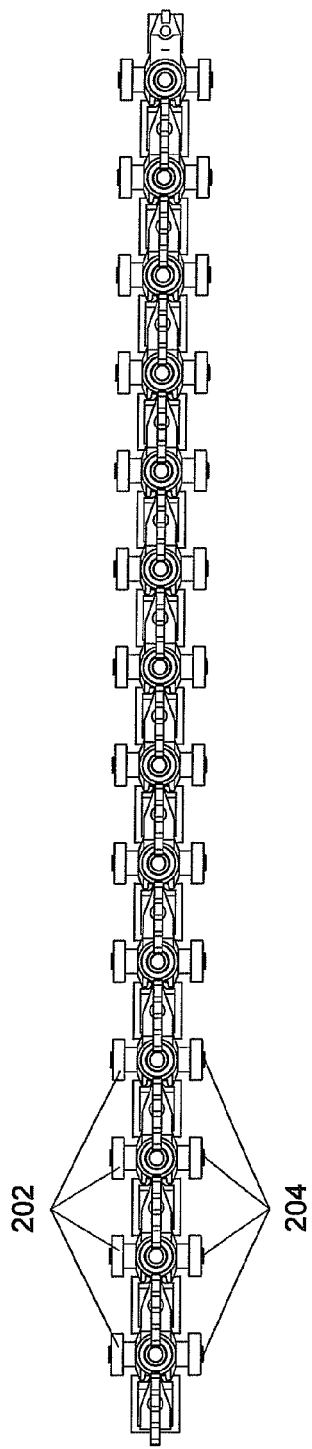
FIG. 21 is top view of the conveying member according to FIG. 20.

The transport members shown in the various Figures comprise functional elements in the form of first chain links 100 and second chain links 200. Each of the first chain links 100 is provided with a comb-type embodied connecting region 110 for connecting the transport member to a drive chain 530 (see FIG. 30). According to FIGS. 20 and 21, however, each of the second chain links 200 comprises a total of four guide rollers 202, 204, 206, 208, wherein the guide rollers 206 and 208 are positioned rotating relative to a first joint roller axis and the guide rollers 202, 204 are positioned rotating relative to a second, joint roller axis. The first and the second roller axes extend perpendicular to each other and are arranged in a single plane. Each of the first chain links 100 is arranged between two second chain links 200. For this, each of the first chain links 100 is on the one hand rigidly connect to one of the second chain links 200, to form a functional arrangement and, on the other hand, is connected articulated to the other of the second chain links 200 to form an articulated arrangement.

Figure 22:
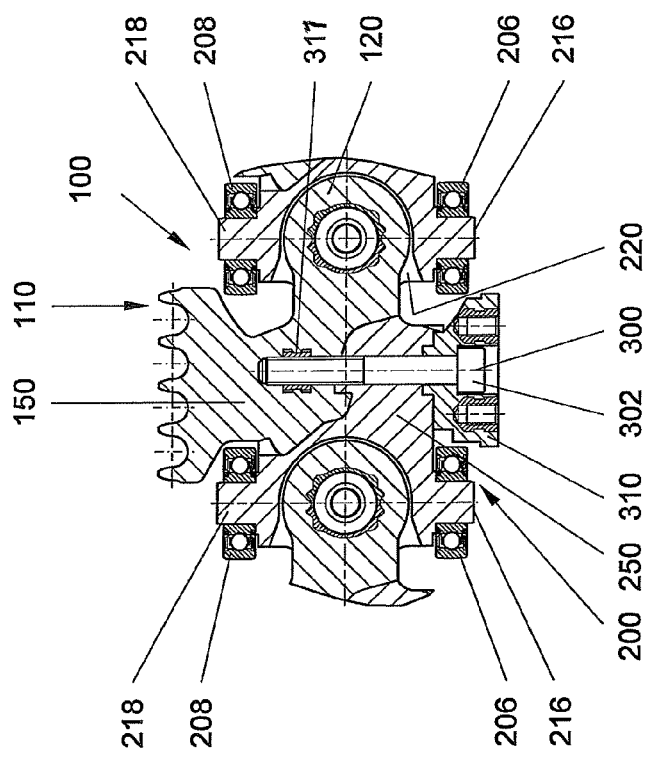
FIG. 22 is a sectional view of a portion of a conveying member.
Figure 24:
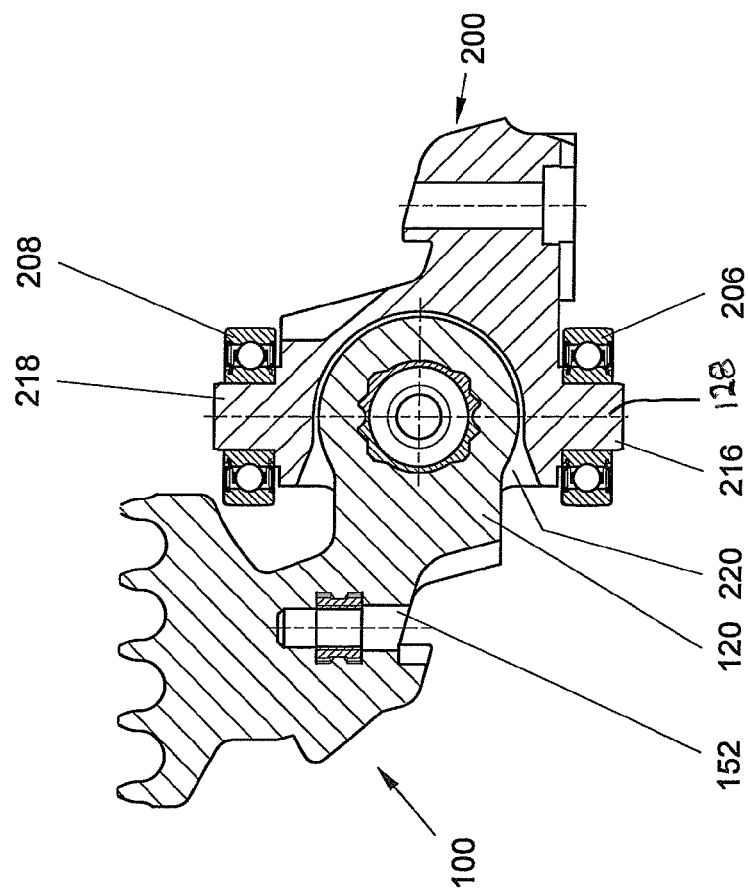
FIG. 24 is a vertical section in the conveying direction through the transport member shown in FIG. 23.

FIG. 22 depicts the rigid connection between the first chain links 100 and the second chain links 200, which results in forming the functional arrangement. Based thereon, a screw bolt 300 is used to connect the first chain links 100 to the second chain links 200. This bolt extends through a bore hole in a connecting region 250 of the second chain link 200 and is screwed into a connecting region 150 of the first chain link 100. A blind hole 152 into which a thread insert 310 is fitted is formed for this in the first chain link 100, so that the bolt 300 can be screwed into it. The blind hole 152 is arranged below the coupling region 110, as shown in FIG. 24, wherein following the joining of the first chain link 100 to the second chain link 200, all guide rollers 202, 204, 206, 208 are arranged on the side of the coupling region 110 that is facing the bolt head 302 of the bolt 300, so that the F is freely accessible outside of the guide rollers 202, 204, 206, and 208. The bolt head 302 fits flush against the side of the second chain link 200 that is facing away from the coupling region 110, with a connecting device 310 disposed in-between. The connecting device 310 serves to connect the functional devices to the transport member, such as the gripper elements or the clamping elements or the lamellas.

Figure 23:
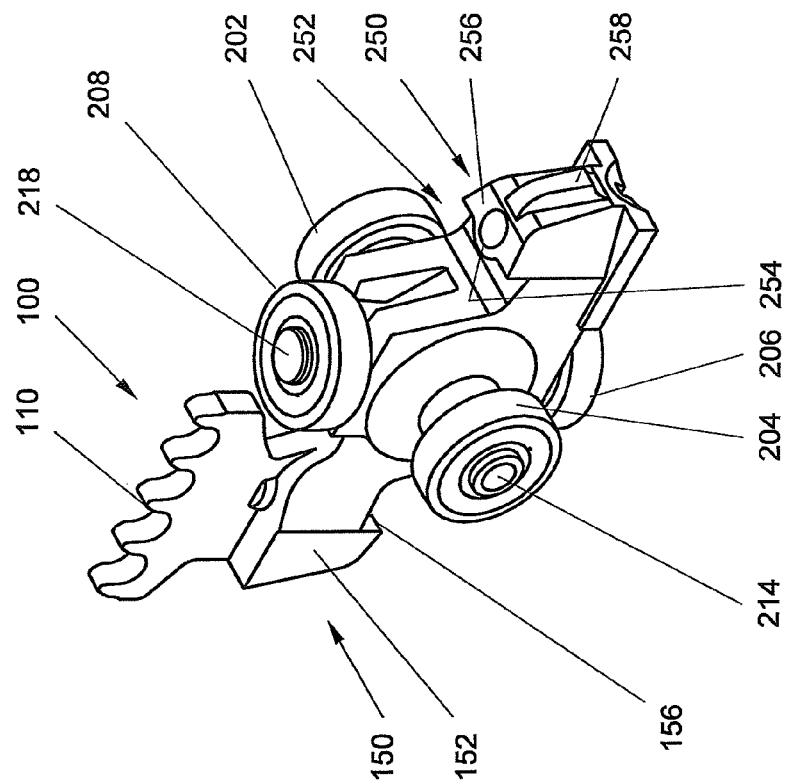
FIG. 23 is a perspective view of the transport member comprising first and second links.

It is quite obvious from FIG. 23 that the connecting region 250 of the second chain link 200 is provided with a projection 256 and a ring-shaped recess 252 into which a bulge 254 of the projection 256 extends while the connecting region 150 of the first chain link 100 is provided with a complementary projection 152 that engages in the ring-shaped recess 252 and is embodied to contain a depression 156 for accommodating the projection 256. The projection 152 furthermore contains a depression for accommodating the bulge 254, so that by fitting the connecting region 150 of the first chain link 100 into the connecting region 250 of the second chain link 200, an interlocking connection is established between the first chain link 100 and the second chain link 200 which can be locked in place with the aid of the screw bolt 300 (see FIG. 22) which extends through the projection 256 and into the blind hole 152, formed between the depression 156 and the coupling region 110 of the first chain link 100. To further secure the position of the interlocking connection between the first connecting region 150 and the second connecting region 250, the projection 256 is also provided with a nose-type projection 258 which engages in a depression in the recess 156.

Figure 30:
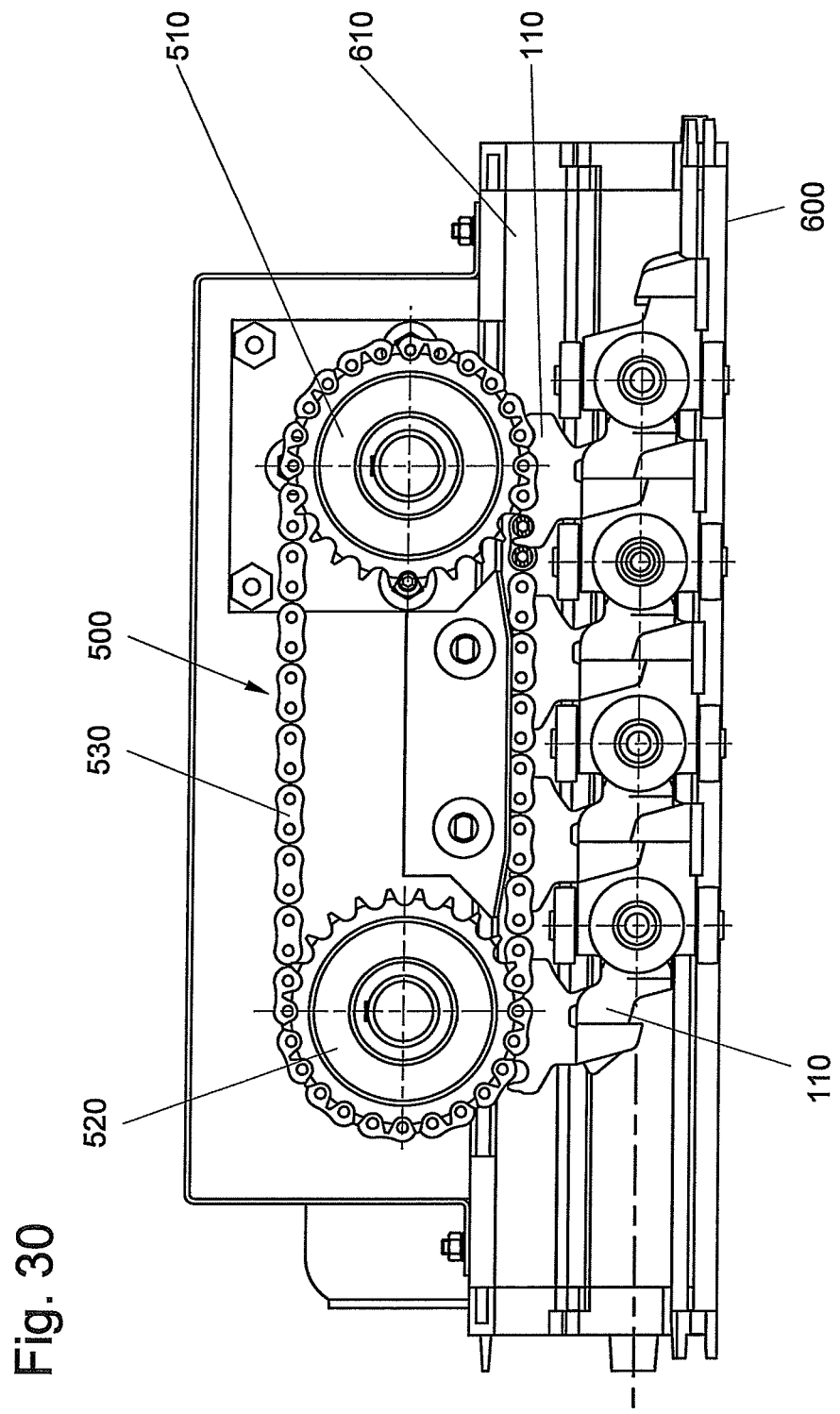
FIG. 30 is a cutaway side view of guide arrangement showing a conveying member inside the channel of the guide arrangement being driven by a drive chain.

According to FIG. 22, the coupling region 110 is embodied to resemble a comb, with teeth that extend approximately parallel to the axis of the screw bolt 300, wherein a space is formed between the comb teeth in which the chain bolts for the drive chain 530 engage (see FIG. 30). The guide rollers 202, 204, 206, 208 are positioned rotating on guide pins 212, 214, 216, 218, thereby making available between the guide pins 212, 214, 216, 218 a space for producing an articulated connection between the first chain links 100 and the second chain links 200. The articulated arrangement produced by the articulated connection between the first chain links 100 and the second chain links 200 is explained with the aid of FIGS. 14-17.

According to FIGS. 23 and 24, the first chain link 100 is provided with an insertion region 120 that extends transverse to the bolt axis, wherein this first insertion region is accommodated in a holding region 220 which is formed between the guide pins 212, 214, 216, 218 of the second chain link 200. The insertion region 120 is embodied as a circular disk segment while the holding region 220 is embodied as a cup-shaped circular disk segment, so with the aid of the limiting surfaces of the insertion region 120 and the holding region 220, a guide is formed for a pivoting movement of the first chain link 100 relative to the second chain link 200, around the pivoting axis formed by the second roller axis.

Figure 25:
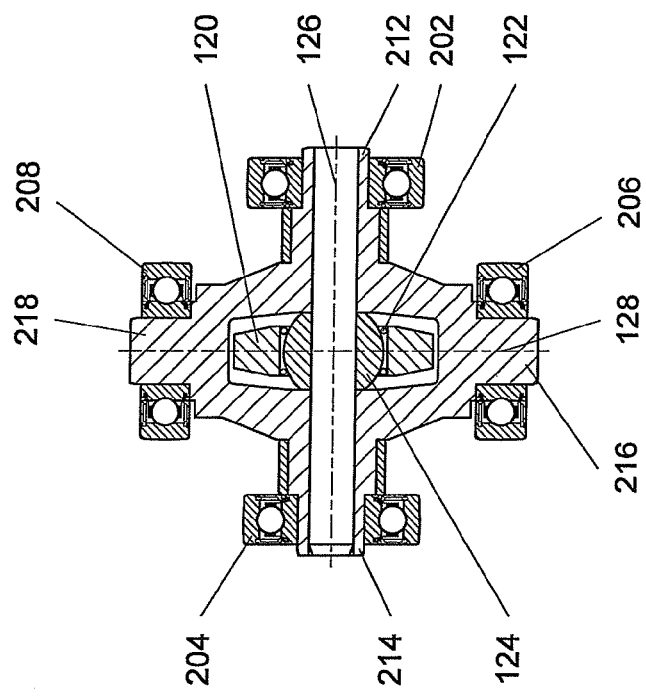
FIG. 25 is vertical section through axis 128 in FIG. 24 in a plane normal to the page.

According to FIG. 25, the articulated connection between the first chain link 100 and the second chain link 200 comprises a ball segment 124, which is fitted into the insertion region 120, wherein a ball cup segment type sliding element 122 of a plastic material with low frictional sliding coefficient is arranged between the ball segment 124 and the outside region of the insertion region 120. The ball segment 124 and the ball cup segment 122 extend through the insertion region 120. The insertion region 120 for accommodating the ball segment 124 is positioned with the aid of the ball cup segment 122 rotating on the ball segment 124, so that following the fitting of the insertion region 120 into the holding region 220, the first chain link 100 with the insertion region 120 is positioned pivoting, relative to the axis of the connecting bolt 126 and an axis 128 that extends perpendicular thereto and parallel to the screw bolt 130. The pivoting movement relative to the pivoting axis 128 is predetermined by the width of the holding region 220, in the direction predetermined by the axis of the bolt 126, wherein this width can be expanded if necessary.

Figure 26:
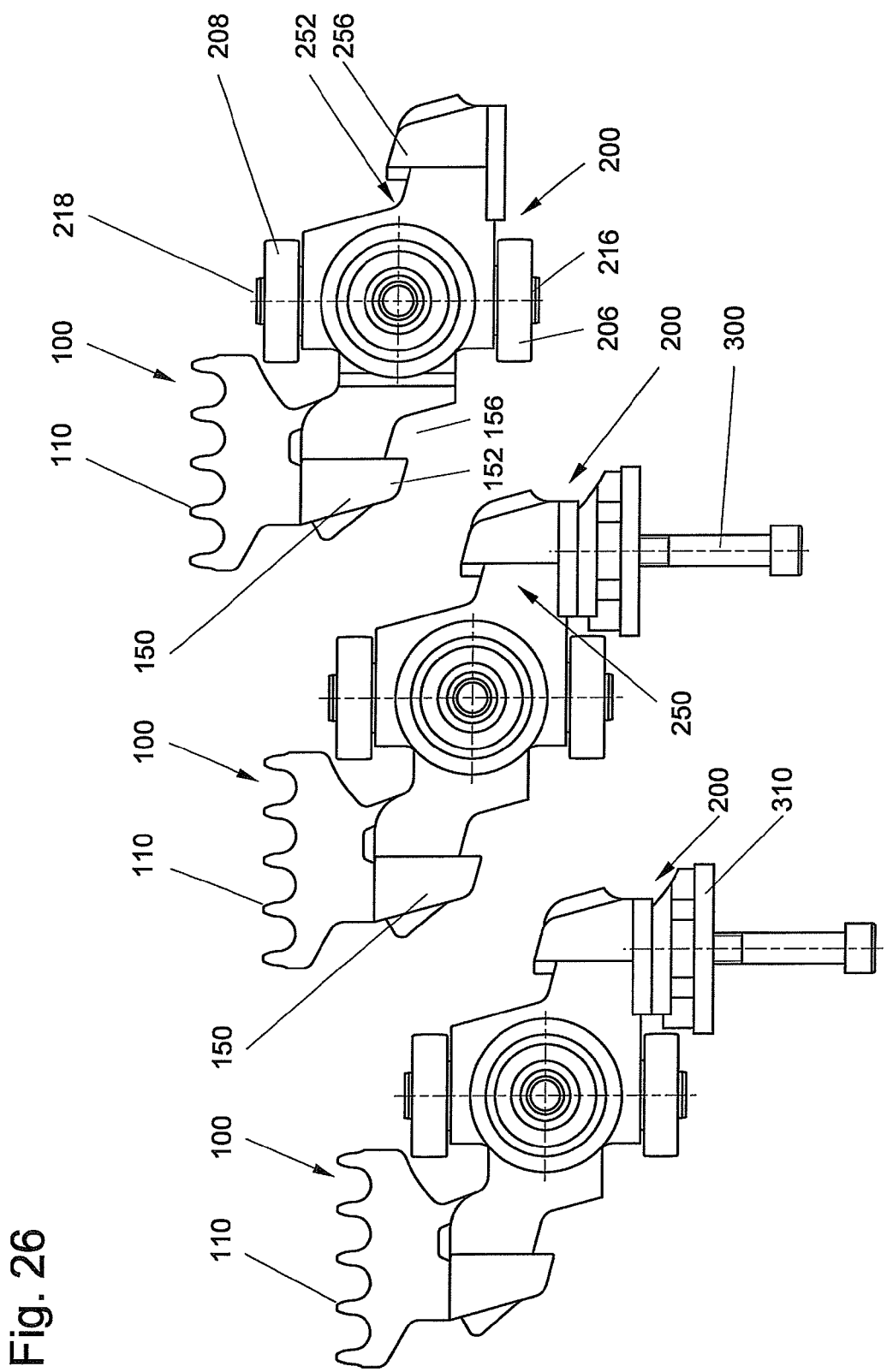
FIG. 26 is a representation illustrating the manner in which the transport members are connected to each other.

FIG. 26 shows a conveying member installed according to the invention which comprises a number of transport members, respectively consisting of a first and a second chain link, wherein this Figure is explained in further detail below.

FIGS. 27 and 28 show the first chain link 100 in further detail. According to FIGS. 28 and 29, the insertion region 120 of the first chain link 100 is embodied with a ball segment 124 that is partially embedded in a plastic material with low friction in order to form a ball cup segment 122, wherein the ball segment 124 can be embodied by injection-molding around it with a plastic, in particular a fiber-reinforced plastic, in order to form the insertion region 120. The ball cup segment 122 is formed integrally, but can also consist of two or more parts. With this injection-molding operation, the connecting region 150 and the coupling region 110 can also be formed simultaneously, wherein it should be kept in mind that the thread insert 311 must be inserted into the blind hole 152 during the injection-molding operation. According to FIG. 26, conveying members and/or transport members according to the invention can be installed by initially pre-assembling articulated arrangements composed of first chain links 100 and second chain links 200 which are then fitted together in the connecting regions 150 and/or 250 and are subsequently secured in place with the aid of screw bolts 300.

According to FIG. 30, driving mechanism 500 belonging to the prior art can be moved along a conveying section formed by a guide rail arrangement 600, wherein the transport member is installed in the guide rail arrangement 600 and is moved along corresponding running surfaces of the guide rail arrangement 600 with the aid of the guide rollers 202, 204, 206 and 208. The coupling regions 110 are located in a drive space 610 of the guide rails 600 and mesh in the drive sections of the guide rail arrangement 600 with a drive chain 530 of a driving mechanism 500 which chain moves around two chain wheels 510 and 520. To connect the drive chain 530, it is only necessary to provide an opening in a limit surface of the drive space 610 through which the drive chain 530 can enter the coupling regions 110.

The invention is not restricted to the exemplary embodiments explained with the aid of the drawing. Rather, it is conceivable to use transport members with differently embodied guide rail arrangements, provided with three or fewer guide rollers, guide pins, or the like. The coupling regions of the transport members can furthermore be embodied differently. Also conceivable is a gimbal-type connection between individual chain links for forming the articulated arrangements.

Reference is made in particular to variations of the inventive embodiments, insofar as these have not already been explained in the further description. For example, reference is made to the options that the functional units, composed as previously explained of respectively one first and one second chain link which are operatively connected, with respect to the sequence for forming a transport member or a conveying member can be configured congruent or quasi-congruent or the like or, also can be configured differently based on their functionality, wherein the different functions of the two chain links and the connecting options relative to each other of course are maintained. However, it is also possible that a second chain link does not immediately follow a first chain link, but that two or more second chain links, for example, can follow a first chain link as needed or vice versa that two or several first chain links can be connected one behind the other. The sequentially arranged functional units in that case are provided with means or connecting elements for a detachable connection or a conditionally detachable force-locking connection, and/or a non-detachable connection. On the one hand, it means that the geometric and functional embodiment of the individual guide units does not have to be uniform across the complete conveying member. Variations in-between which are determined by the operation are also possible. On the other hand, it is emphasized that the functional units can also be connected differently, relative to each other, at least for forming a transport member, wherein a detachable connection such as a screw connection will be selected for this in most cases. However, it is also possible to provide for a force-locking connection which then acts like a detachable connection, if applicable. Finally, it should not be precluded that the individual conveying units can be fixedly connected to each other with the aid of a non-detachable connection, for example a welded connection. These embodiment options are not shown in detail in the various Figures since they are known to one skilled in the art. Additional units can be installed and/or arranged between the individual functional units and/or the chain links which meet a specific functionality. This functionality can extend over a wide range, for example so as to improve the operation of the functional units, or units can be provided in connection with the transport of the printed products or the conveyed goods.

The invention has been described in detail with respect to various embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A guide arrangement for guiding movement of a transport member to convey products in a conveying direction of a conveying section having a predetermined course, wherein the transport member includes a number of functional units operatively connected to each other, the guide arrangement comprising:

a number of sequentially connected guide rail elements defining a guide channel along the conveying section, the guide channel having inside walls including structure to guide the transport member, wherein a respective guide rail element has opposite end faces extending normal to the conveying direction; and connecting elements each attached to a respective one of the end faces to interconnect the guide rail elements, wherein one connecting element includes mirror-inverted positioning parts, relative to an adjacent connecting element of a sequentially connected guide rail element, wherein the mirror-inverted positioning parts ensure a congruent continuation of the guide channel.

2. The guide arrangement according to claim 1, wherein adjacent connecting elements on adjacent guide rail elements are interconnected at least in a force-locking manner to form the conveying section in the conveying direction, and the structure includes running surface elements along successively arranged guide rail elements.

3. The guide arrangement according to claim 1, wherein the connecting elements of the guide rail elements have flanges including the positioning parts, and the positioning parts include at least one projection and at least one depression which are fitted into mirror-inverted, complementary geometries on an oppositely-arranged connecting element.

4. The guide arrangement according to claim 1, wherein the guide rail elements include running surface elements that define rolling planes along which the transport member is guided with a running fit, wherein the running surface elements are arranged one of parallel opposite each other or parallel mirror-inverted and spaced apart by a distance that corresponds to a diameter of a guide roller belonging to the transport member.

5. The guide arrangement according to claim 4, wherein the transport member is moved on the running surface elements while moving along an imaginary center line of the guide channel.

6. The guide arrangement according to claim 1, wherein the connected guide-rail elements comprise one of straight sections, curved sections or twisted transitions.

7. The guide arrangement according to claim 1, wherein the guide channel includes an opening through which a chain drive associated with the transport member is movable.

8. The guide arrangement according to claim 1, wherein the guide rail element has a polygonal to round cross section.

9. A guide arrangement for guiding movement of a transport member to convey products in a conveying direction of a conveying section having a predetermined course, wherein the transport member includes a number of functional units operatively connected to each other, the guide arrangement comprising:

a number of sequentially connected guide rail elements defining a guide channel along the conveying section, the guide channel having inside walls including structure to guide the transport member, wherein a respective guide rail element has end faces each including a force-locking connecting element, wherein one connecting element includes mirror-inverted positioning parts, relative to an adjacent connecting element, wherein the mirror-inverted positioning parts ensure a congruent continuation of the guide channel, wherein the connecting elements of the guide rail elements have flanges including the positioning parts, and the positioning parts include at least one projection and at least one depression which are fitted into mirror-inverted, complementary geometries on an oppositely-arranged connecting element, wherein the projection and the depression include mirror-inverted, tapered contours.

10. A guide arrangement for guiding movement of a transport member to convey products in a conveying direction of a conveying section having a predetermined course, wherein the transport member includes a number of functional units operatively connected to each other, the guide arrangement comprising:
a number of sequentially connected guide rail elements defining a guide channel along the conveying section, the guide channel having inside walls including structure to guide the transport member, wherein a respective guide rail element has end faces each including a force-locking connecting element, wherein one connecting element includes mirror-inverted positioning parts, relative to an adjacent connecting element, wherein the mirror-inverted positioning parts ensure a congruent continuation of the guide channel further including a chamfer disposed in an area of transition from one of the guide rail elements or from a connecting element to one of a following guide-rail element or an associated connecting element; and an adapter element arranged to bridge the chamfer.

11. A guide arrangement for guiding movement of a transport member to convey products in a conveying direction of a conveying section having a predetermined course, wherein the transport member includes a number of functional units operatively connected to each other, the guide arrangement comprising:
a number of sequentially connected guide rail elements defining a guide channel along the conveying section, the guide channel having inside walls including structure to guide the transport member , wherein the guide rail elements include running surface elements that define rolling planes along which the transport member is guided with a running fit, wherein the running surface elements are arranged one of parallel opposite each other or parallel mirror-inverted and spaced apart by a distance that corresponds to a diameter of a guide roller belonging to the transport member, wherein the running surface elements are arranged parallel, mirror-inverted only along a contact plane with the guide roller.

12. A guide arrangement for guiding movement of a transport member to convey products in a conveying direction of a conveying section having a predetermined course, wherein the transport member includes a number of functional units operatively connected to each other, the guide arrangement comprising:
a number of sequentially connected guide rail elements defining a guide channel along the conveying section, the guide channel having inside walls including structure to guide the transport member, wherein the guide rail elements include running surface elements that define rolling planes along which the transport member is guided with a running fit, wherein the running surface elements are arranged one of parallel opposite each other or parallel mirror-inverted and spaced apart by a distance that corresponds to a diameter of a guide roller belonging to the transport member, wherein the guide channel has side walls defining an inside and a number of fixed support regions respectively arranged at least on one of the side walls, and wherein the running surface elements are supported at least frictionally adhering on the support regions.

13. The guide arrangement according to claim 12, wherein the support regions include first and second oppositely-arranged, spaced-apart support regions arranged on a side of a first wall and are adapted to accommodate respective first and second running surface elements, third and fourth oppositely-arranged, spaced-apart support regions arranged on an opposite side wall and adapted to accommodate respective third and a forth running surface elements, and wherein respectively adjacent to each side wall support region, are arranged fifth and sixth oppositely-arranged, spaced-apart support regions to accommodate respective fifth and sixth running surface elements, and seventh and eighth oppositely-arranged, spaced apart support regions are arranged to accommodate respective seventh and eighth running surface elements, wherein each support region is arranged at a right angle to an adjacent support region.

14. The guide arrangement according to claim 13, wherein the first running surface element is arranged opposite and spaced apart from the second running surface element, the third running surface element is arranged opposite and spaced apart from the fourth one running surface element, the fifth running surface element is arranged opposite and spaced apart from the sixth running surface element, and the seventh running surface element is arranged opposite and spaced apart from the eighth running surface element, and wherein the running surfaces elements are respectively arranged in pairs.

15. The guide arrangement according to claim 14, wherein the oppositely arranged and spaced apart running surface elements have surfaces that are spaced by a distance that corresponds approximately to a diameter of guide rollers of the transport member.

16. The guide arrangement according to claim 13, wherein at least the first, third, fifth and seventh support regions support running surface elements.

17. A combination comprising a guide arrangement and a transport member for use in the guide arrangement to guide a movement of printed products in a conveying direction along a conveying section having a course that is predetermined by the guide arrangement, wherein:
the guide arrangement comprises: a number of sequentially connected guide rail elements defining a guide channel along the conveying section, the guide channel having inside walls including structure to guide the transport member; and
the transport member comprises: a number of functional units connectable together, each functional unit comprising at least first and second, sequentially arranged chain links positioned along the conveying section, the chain links comprising one of a rigid or articulated connection, relative to each other, wherein the first chain link and the second chain link differ in their functions and are operatively connected to each other, wherein in their sequence for forming the transport member the functional units are configured congruent, quasi-congruent, or are configured differently based on their functionality, and wherein the functional units include connecting elements to form one of a detachable connection, a force-locking connection, or a non-detachable connection, wherein at least one of the chain links of the functional units includes a functional device connected remote from a chain drive, and wherein each functional unit includes at least four guide rollers; and wherein the guide arrangement further includes: a plurality of running surface elements extending along the conveying section for accommodating the transport member and for delimiting the guide channel that is open on one side, and wherein at least four running surface elements make running contact with at least two of the guide rollers of a functional unit.

18. The combination according to claim 17, wherein at least one fifth running surface element is operative with at least one third guide roller to counteract a pivoting movement generated during operation.

19. The combination according to claim 17, wherein a running contact between the running surface elements and the guide rollers which are operatively connected with the running surface elements is without play or quasi without play.

20. The combination according to claim 17, wherein the functional device includes a gripper for transporting printed products.

* * * * *